(12) United States Patent
Gordin et al.

(10) Patent No.: US 8,952,628 B1
(45) Date of Patent: Feb. 10, 2015

(54) APPARATUS, SYSTEM AND METHOD FOR PROVIDING INTERMITTENT UPLIGHTING

(75) Inventors: Myron Gordin, Oskaloosa, IA (US); David L. Barker, Ottumwa, IA (US)

(73) Assignee: Musco Corporation, Oskaloosa, IA (US)

( * ) Notice: Subject to any disclaimer, the term of this patent is extended or adjusted under 35 U.S.C. 154(b) by 594 days.

(21) Appl. No.: 12/939,838

(22) Filed: Nov. 4, 2010

Related U.S. Application Data

(60) Provisional application No. 61/258,359, filed on Nov. 5, 2009.

(51) Int. Cl.
*G05F 1/00* (2006.01)

(52) U.S. Cl.
USPC ............. 315/307; 315/291; 315/297

(58) Field of Classification Search
USPC ............. 315/185 R, 192, 210, 193, 295, 291, 315/297, 299, 307, 308, 312, 313, 362, 360
See application file for complete search history.

(56) References Cited

U.S. PATENT DOCUMENTS

| | | | |
|---|---|---|---|
| 5,519,590 A | 5/1996 | Crookham et al. | |
| 5,860,733 A | 1/1999 | Stone et al. | |
| 6,803,727 B2 * | 10/2004 | Laerum et al. | 315/129 |
| D567,995 S | 4/2008 | Gordin et al. | |
| D583,500 S | 12/2008 | Gordin | |
| 7,458,700 B2 | 12/2008 | Gordin | |
| 7,467,880 B2 | 12/2008 | Gordin et al. | |
| 7,956,551 B1 | 6/2011 | Gordin | |
| 7,975,198 B2 | 7/2011 | Yokoyama | |
| 7,988,326 B2 | 8/2011 | Gordin | |
| 8,098,024 B1 | 1/2012 | Gordin | |
| 8,100,552 B2 * | 1/2012 | Spero | 362/231 |
| 2005/0171407 A1 * | 8/2005 | Rosenkranz et al. | 600/249 |
| 2006/0176700 A1 * | 8/2006 | Gordin et al. | 362/294 |

OTHER PUBLICATIONS

TrackMan—Golf Radar Solution Website, [retrieved on Nov. 2, 2009], Retrieved from the Internet: http://www.trackman.dk/.
Laser Technology Inc. Website—Laser-Based Measurement Products, [retrieved on Nov. 2, 2009], Retrieved from the Internet: http://www.lasertech.com.
Sound & Optics Systems, Pamphlet on 10 Inch Parabolic Acoustical Listening Device, 2 pgs., 2004-2005 Sound & Optics Corp., Scottsdale, AZ.
Zelocity Website—Technology—Radar Technology Applied to Sports Performance, [retrieved on Nov. 2, 2009], Retrieved from the Internet: http://www.zelocity.com.

* cited by examiner

*Primary Examiner* — Douglas W Owens
*Assistant Examiner* — Jianzi Chen

(57) ABSTRACT

The invention is directed to a method, apparatus, and system of illuminating a target area and space by providing continuous substantially controlled, concentrated, and aimed light downwardly towards the target area from an elevated position and providing temporary uplight relative to the target area upon a triggering event or condition. The triggering event or condition can be automatically sensed or manually initiated. Examples of automatic sensing include but are not limited to evaluating a sound, an image, or movement of an object. The uplight can be supplied by solid state light sources driven at or above rated operating power for a limited periods of time (e.g. 5-10 seconds for a triggering event in a baseball or football game), to save energy as compared to operating them continuously.

38 Claims, 36 Drawing Sheets

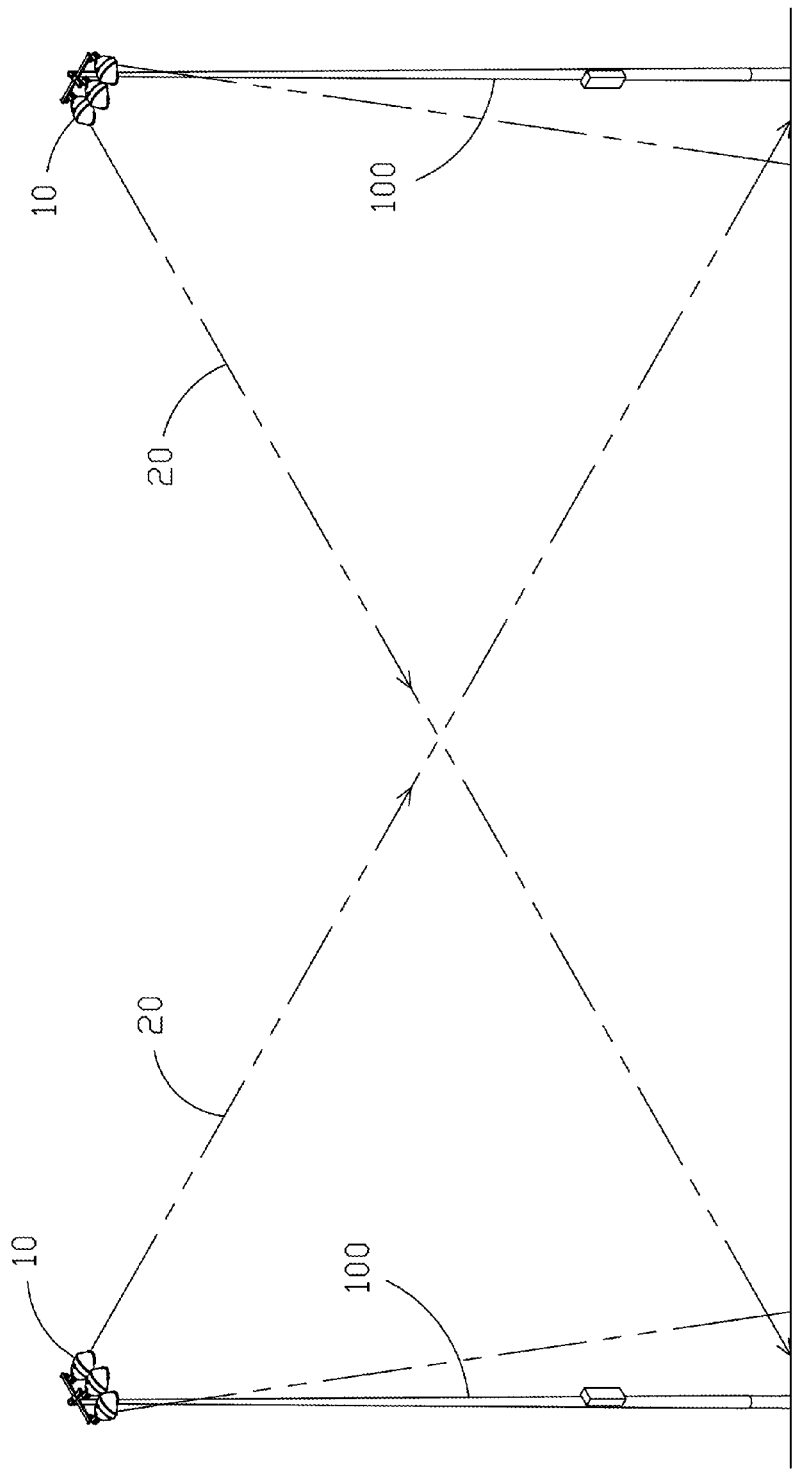

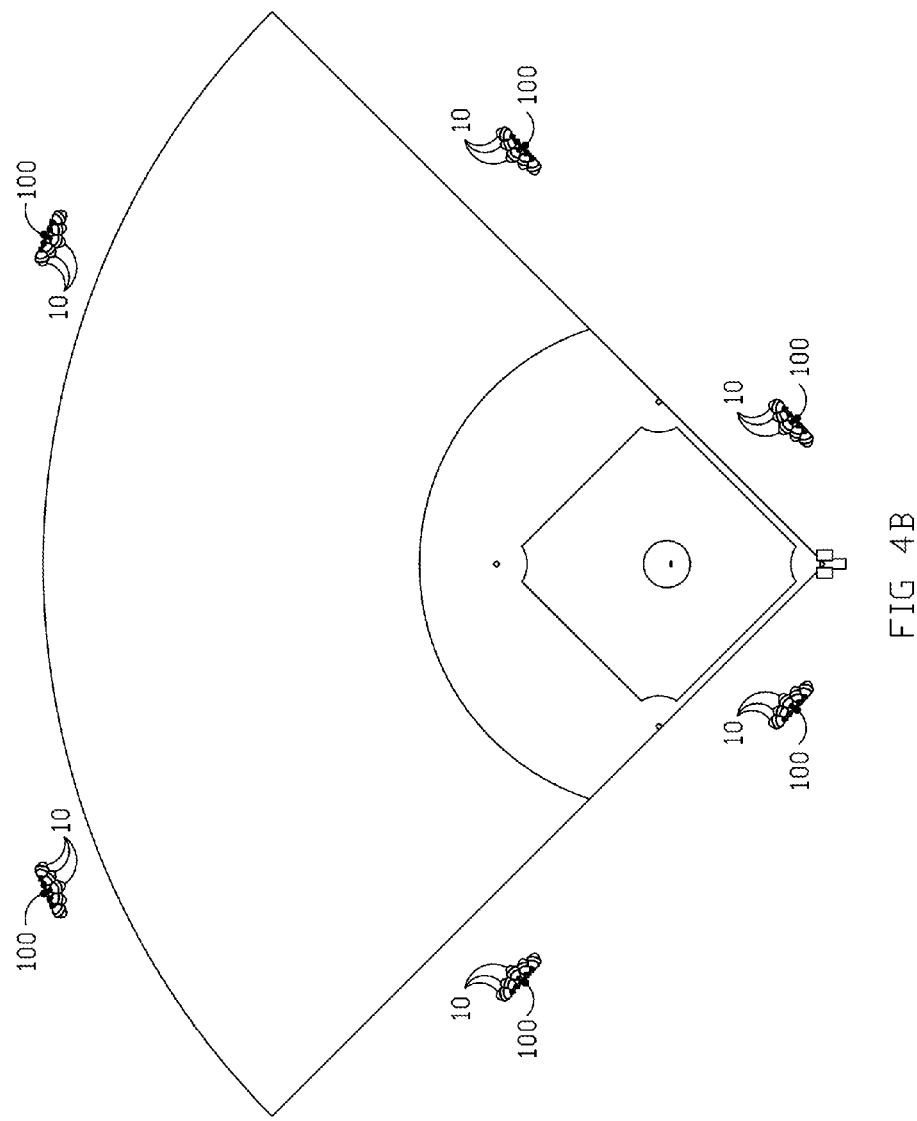

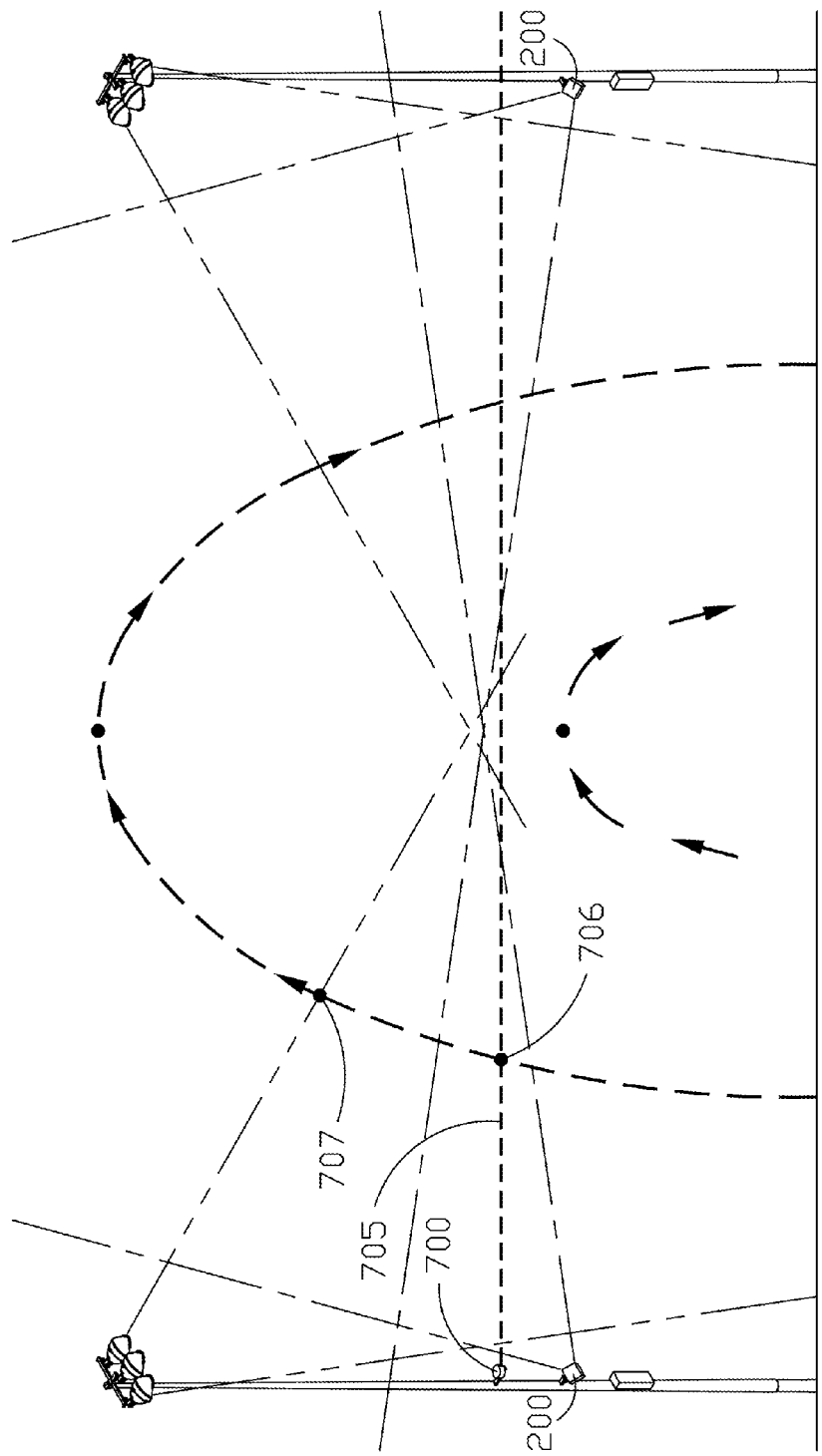

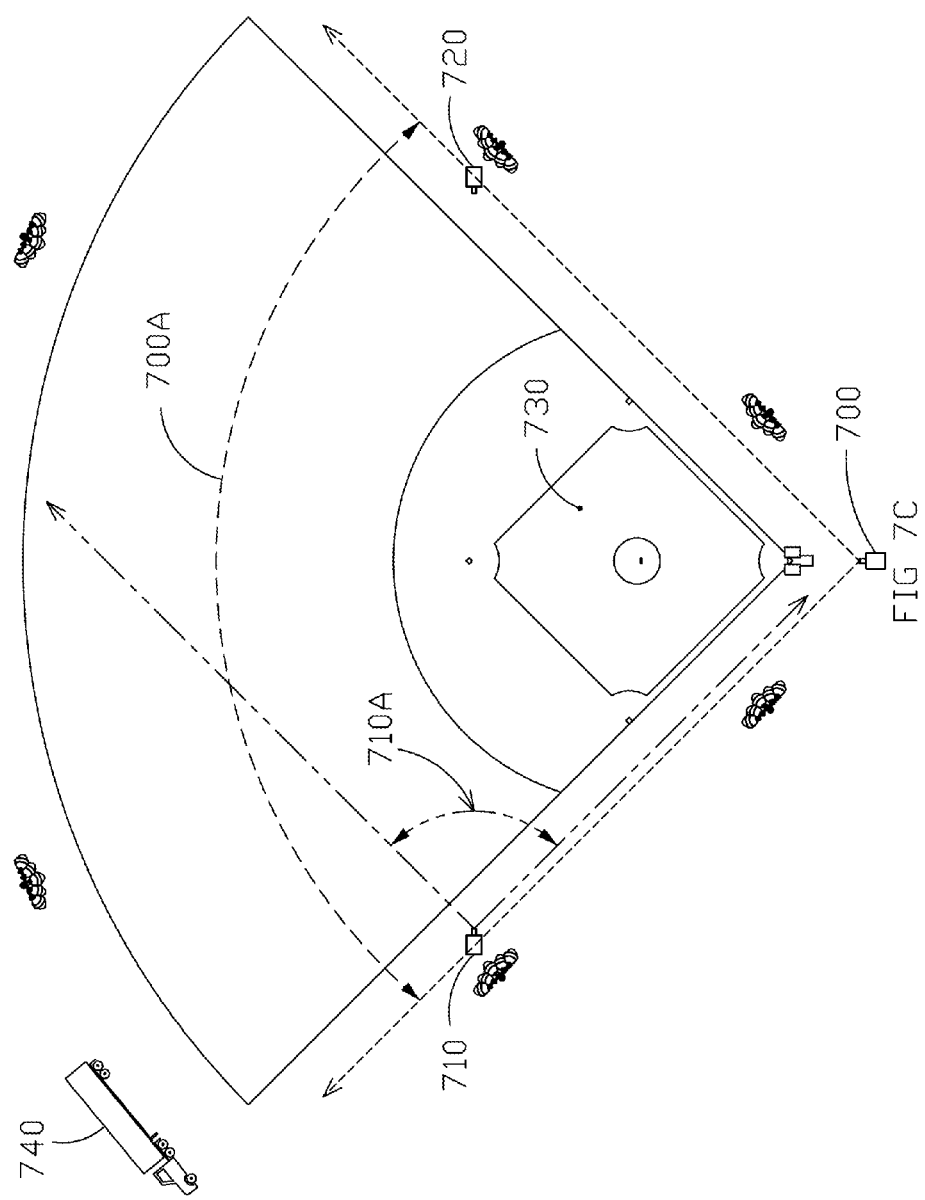

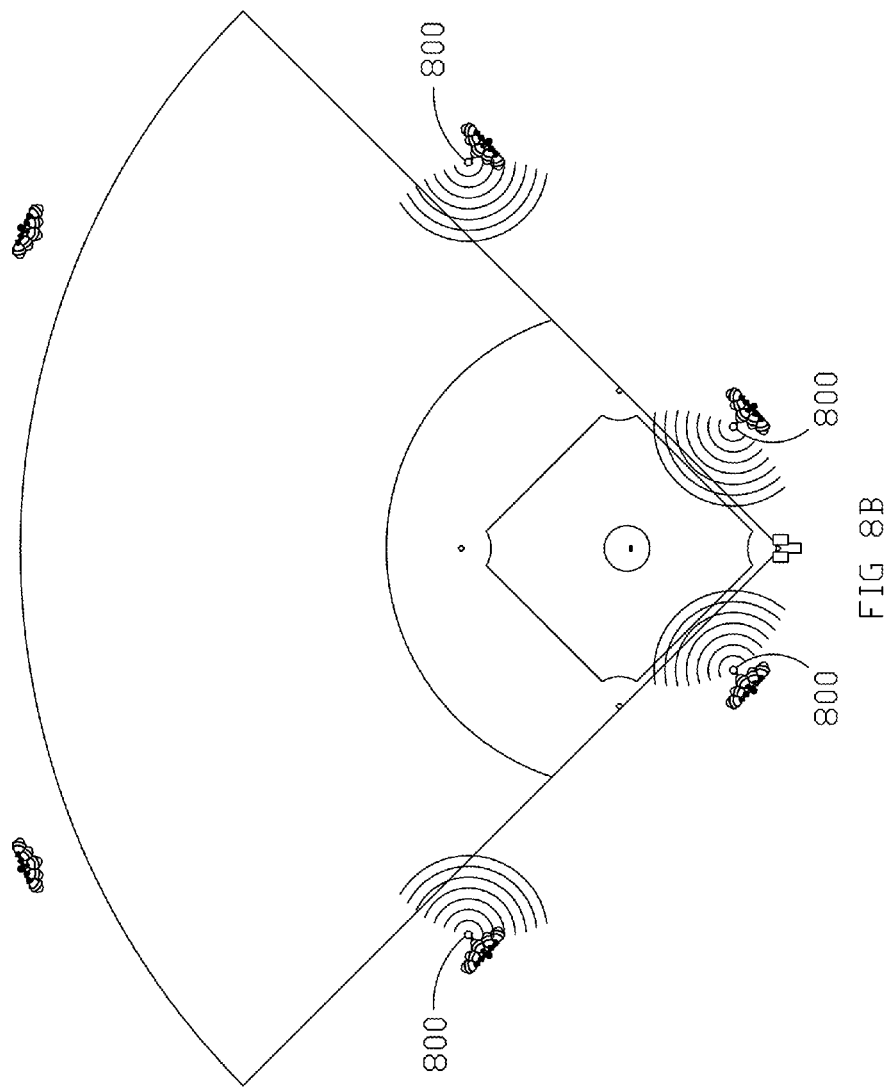

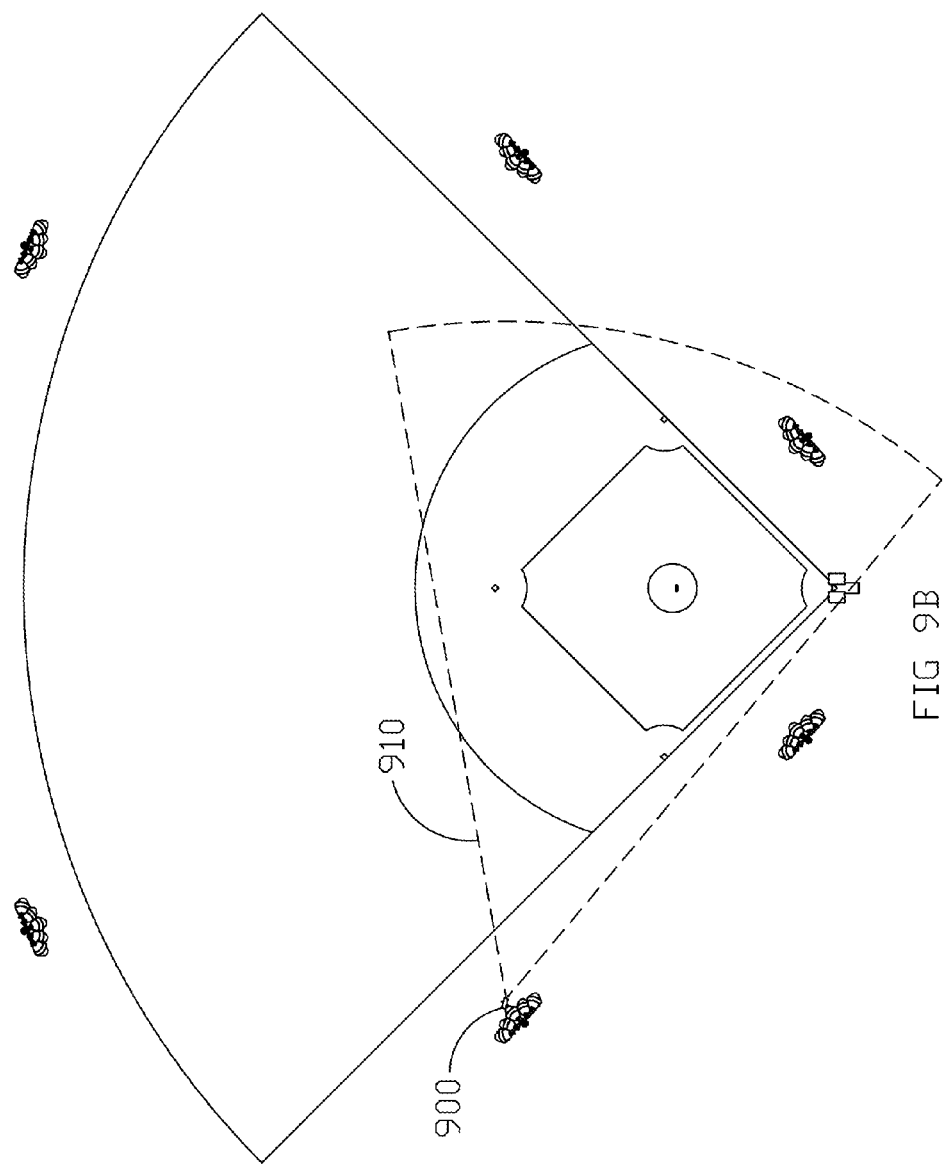

APPARATUS, SYSTEM AND METHOD FOR PROVIDING INTERMITTENT UPLIGHTING

CROSS-REFERENCE TO RELATED APPLICATIONS

This application claims priority under 35 U.S.C. §119 of provisional U.S. application 61/258,359 filed Nov. 5, 2009 which is hereby incorporated by reference in its entirety.

I. BACKGROUND OF THE INVENTION

A. Field of Invention

Embodiments according to aspects of the present invention generally relate to systems and methods for lighting. In particular, embodiments of the present invention relate to systems, methods, and apparatus for lighting sports venues.

B. Background

Sports fields for baseball, football, or other sporting events may be lit by artificial light in order to allow game play at night. In order to do that, evenly distributed lighting is required on the playing field and in the space above the playing field. The lighting is typically concentrated on the ground to allow the actions of the players and the movements of the ball in play within the 'ground zone' to be easily seen by players and spectators. Above the ground zone is a three-dimensional space which may be called the 'fly zone.' The ball is sometimes in play in the fly zone. Lighting is often provided to the fly zone; often as a byproduct of lighting the ground zone.

Light may be provided to the fly zone by intentionally aiming lights up into the fly zone. Or, light may be provided to the fly zone simply as the result of poor control of lights aimed at a playing field. In these cases, sufficient light may be provided to the fly zone by fixtures with limited directional control of light. However, this can result in excess uplight or "sky glow", spill light, and glare for the duration of the event.

Lights which are high enough and which have a high enough aiming angle (i.e., a large enough angle as measured from nadir or straight down from the fixture) may provide some light in at least the lower fly zone, however, this type of lighting is often not sufficient to illuminate at least some portion of travel of a ball that is in play (such as a high fly ball in baseball or a punt or kick in football). Or, it may provide an adequate level of light, but may again contribute to a high level of unwanted light outside and/or above the playing area for the duration of the event. Thus there is room for improvement in the art.

As lighting technology continues to improve, more precise aiming and focusing of lighting on the ground zone results in less on-field glare as well as less undesired uplight, spill, and general glare. Unfortunately, this normally reduces availability of light in the fly zone with the result that more of the fly zone is dark. Attempts to overcome this by intentionally directing some of the light from the fixtures to the fly zone, can result in returning to problems of excess uplight, spill, and glare, as well as increasing energy costs. Further, commonly used HID (high intensity discharge) lights require a warm-up period of several minutes before providing usable light. Thus it is impossible to use conventional lights for intermittent lighting. In the case where these lights are used for intentional illumination of the fly zone, the lighting must be provided to the zone for the duration of the game, even though the light is needed only when the ball is high in the air (which is a relatively small and generally unpredictable percentage of the duration of the game).

It may be seen therefore that efforts to aim lighting more precisely at the field and to reduce uplight, spill, and glare are at cross-purposes with the need to illuminate the ball during the times it is in the fly zone. Thus, there is need for improvement in the art by providing light to the fly zone without significantly adding to uplight, spill and glare, and without requiring such lighting to be on for the duration of the game.

It is therefore apparent that lighting that provides efficient momentary uplighting that is precisely aimed to avoid glare and spill issues and that does not contribute significantly to sky glow or other unwanted conditions is desirable in the industry.

II. SUMMARY OF THE INVENTION

Embodiments according to aspects of the invention described herein comprise an apparatus, system, and method of efficient intermittent or momentary uplighting, triggered by one or more events or conditions, that is precisely aimed, which avoids or reduces glare, spill, sky glow or other unwanted lighting conditions, and which may provide significant operational cost savings over conventional lighting.

Some embodiments according to aspects of the invention provide a way to trigger an event, such as providing light to a target area, based on detection of one or more other events, such as a bat striking a baseball or softball, a football being kicked, etc.

Further embodiments according to aspects of the invention provide an apparatus, system, and method of illuminating objects within a three-dimensional space.

It is therefore a principle object, feature, advantage, or aspect of the present invention to improve over the state of the art and/or address problems, issues, or deficiencies in the art.

These and other objects, features, advantages, or aspects of the present invention will become more apparent with reference to the accompanying specification and claims.

III. BRIEF DESCRIPTION OF THE DRAWINGS

From time-to-time in this description reference will be taken to the drawings which are identified by figure number and are summarized below.

FIG. 1A is a side elevation diagrammatic view of a conventional sports lighting system using HID lights elevated on poles relative to a field, and illustrating low light or lack of light above the upper margin of the relatively highly controlled light beams 20 that can reduce playability for balls moving into that area.

Figure 1B:
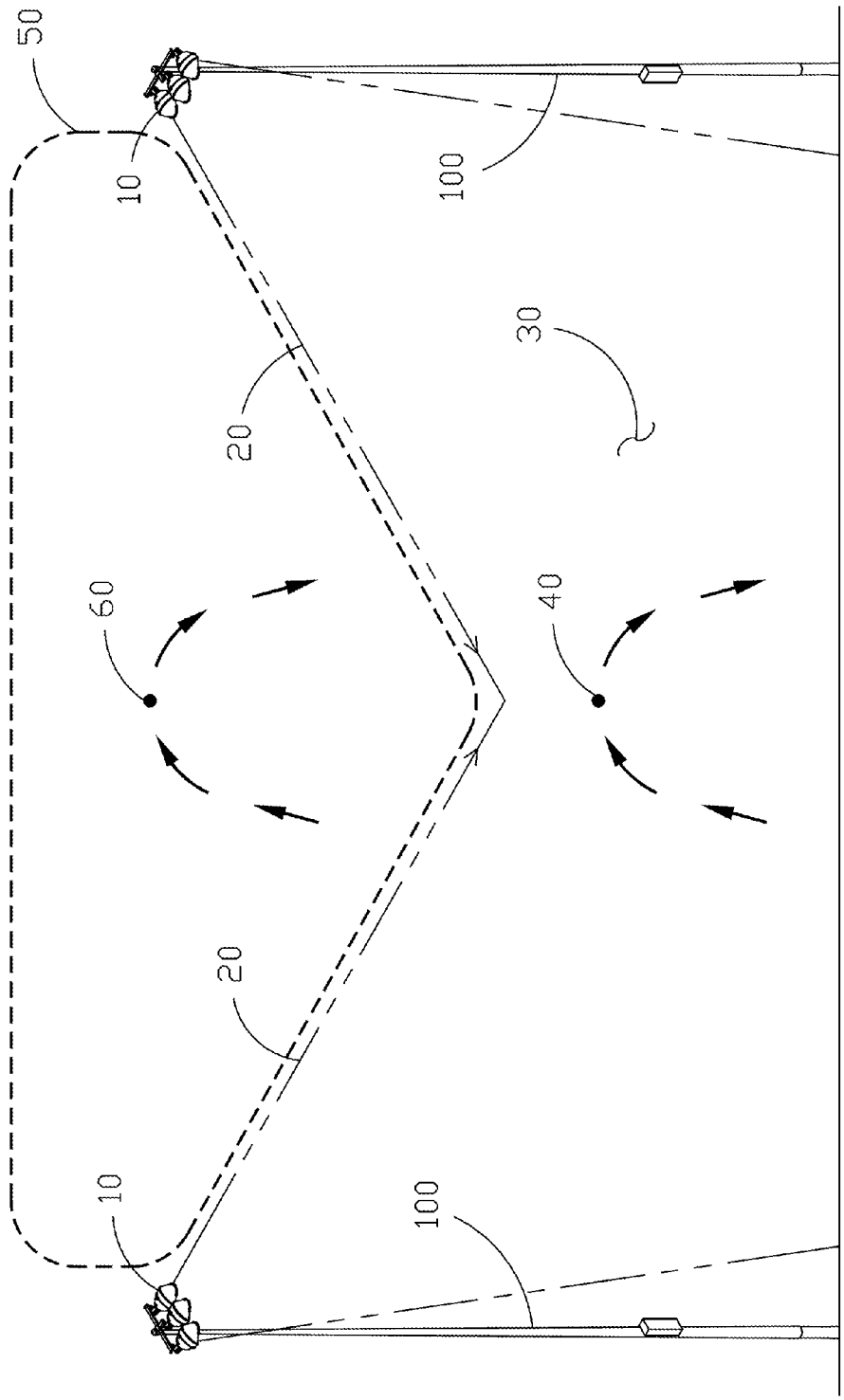
FIG. 1B is similar to FIG. 1A but shows diagrammatically well lit above-field areas and the low light areas above the relatively highly controlled beams.
Figure 2A:
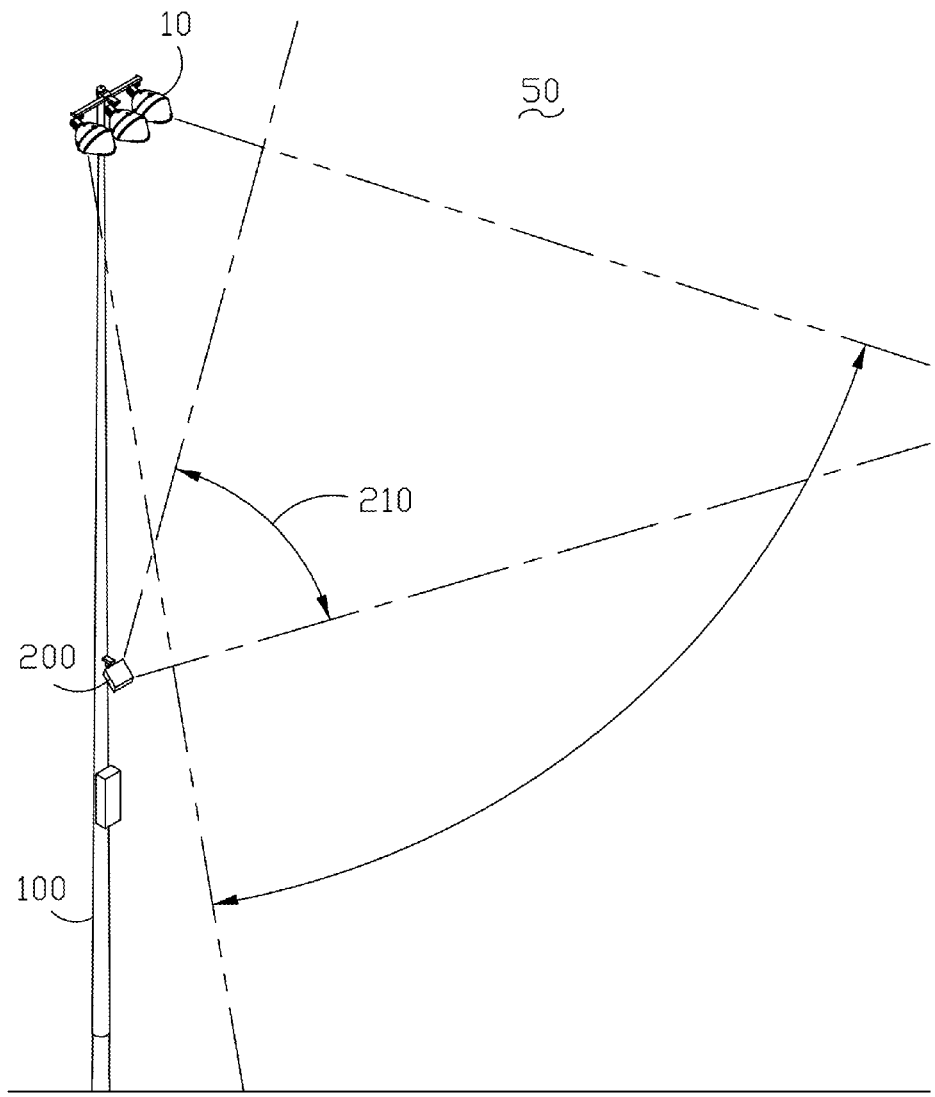
FIG. 2A is a slightly enlarged, isolated view of a conventional sports lighting array of HID light fixtures elevated on a pole like FIG. 1A but with an added fixture or fixtures 200 to provide uplighting according to one exemplary embodiment of the present invention.
Figure 2B:
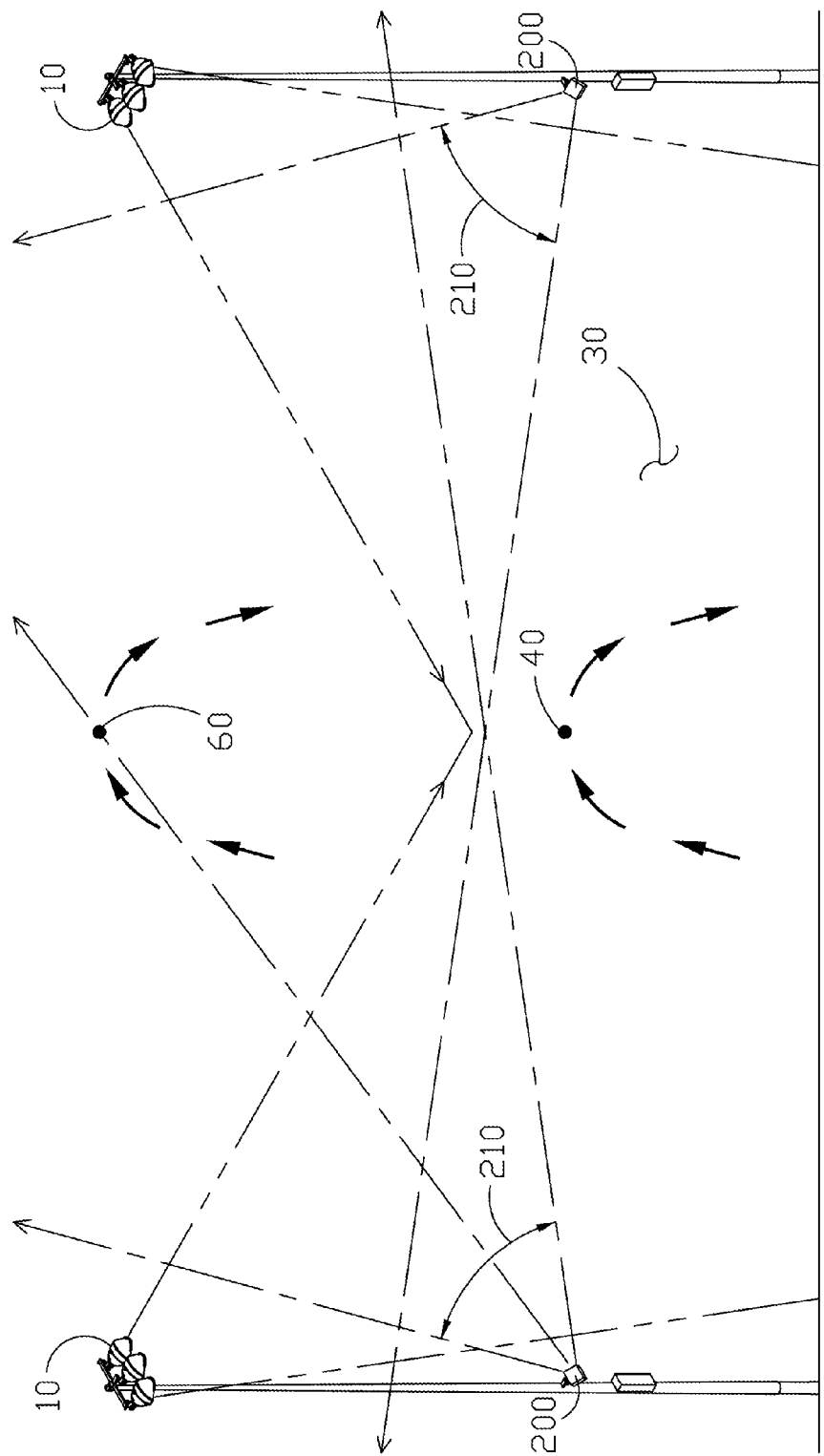

FIG. 2B is similar to FIG. 1A and shows two poles each with the uplight fixture 200 according to an exemplary embodiment of the present invention, such that lighting fixtures 10 provide relatively controlled beams towards the sports field and fixtures 200 can selectively provide a level of uplighting above the upper margins of the beams from fixtures 10.

Figure 2C:
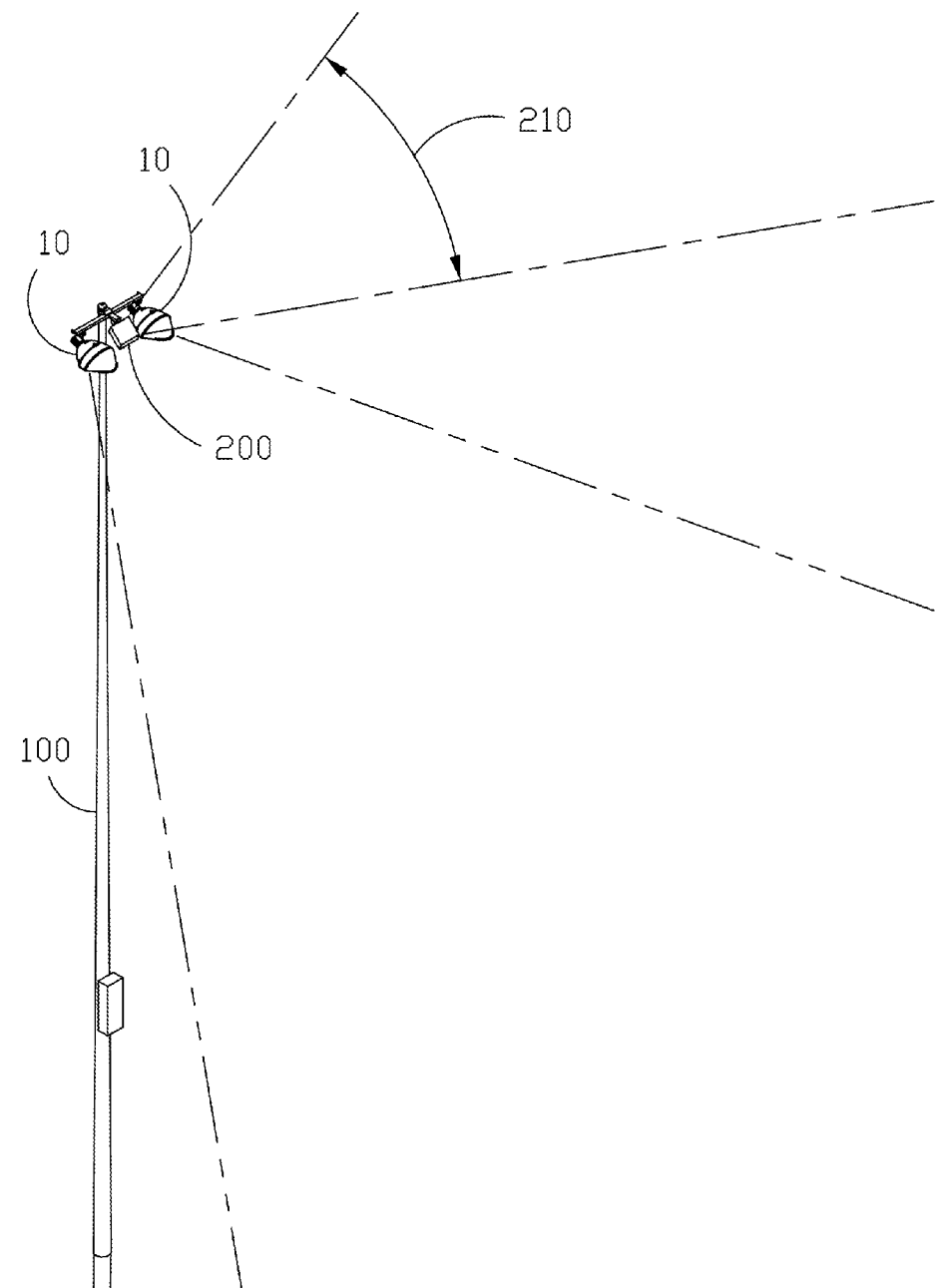

FIG. 2C is similar to FIG. 2A but shows an alternative embodiment according to the present invention, namely an added light fixture 200 up at the level of conventional fixtures 10 to provide selective uplighting.

Figure 3:
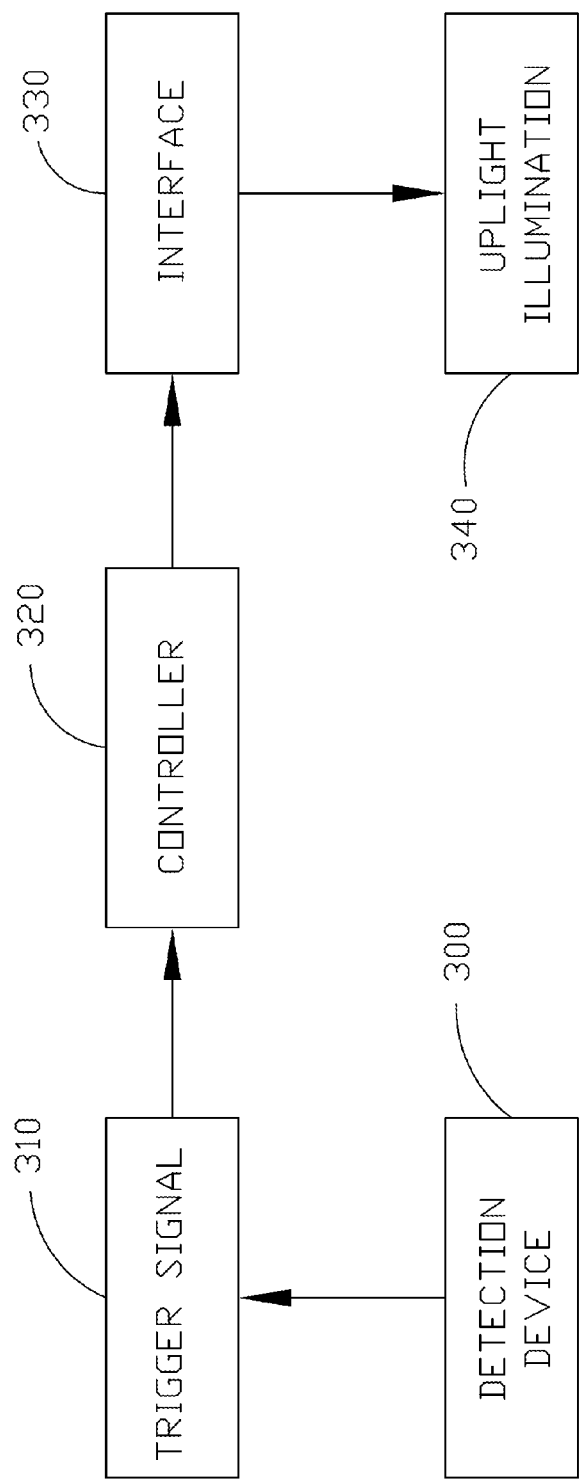

FIG. 3 is a block diagram of a control system for controlling operation of light fixtures 200 according to an exemplary embodiment of the present invention, in one embodiment detecting an event or condition which would automatically trigger operation of fixtures 200.

Figure 4A:
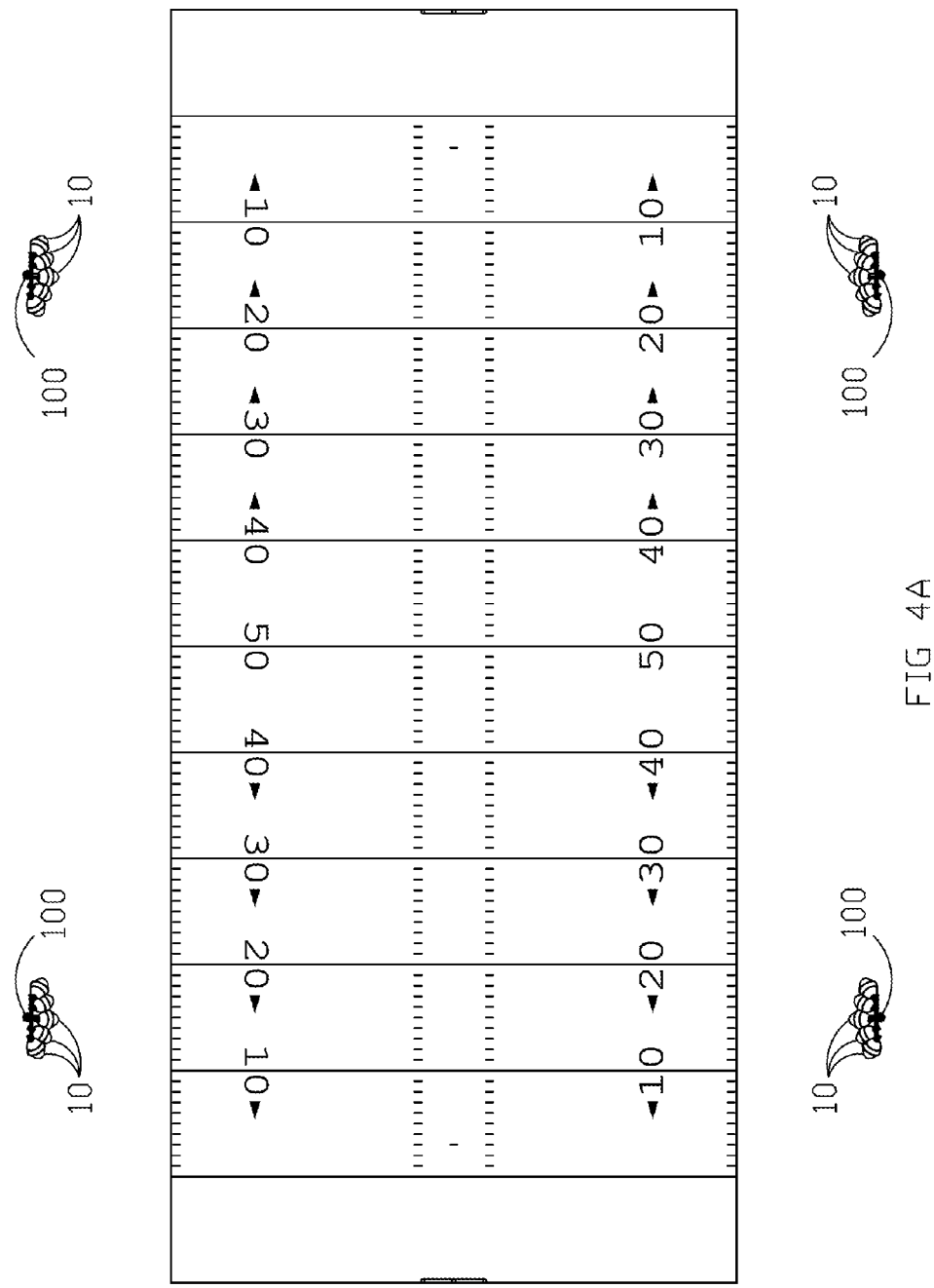

FIG. 4A is a top plan view of a football field, as an example of a sports field, with a plurality of poles having fixtures 10 and 200 according to an exemplary embodiment of the present invention.

FIG. 4B is similar to FIG. 4A, but alternatively showing in top plan view a baseball or softball field with a plurality of light poles with fixtures 10 and 200 according to an aspect of the present invention.

Figure 5A:
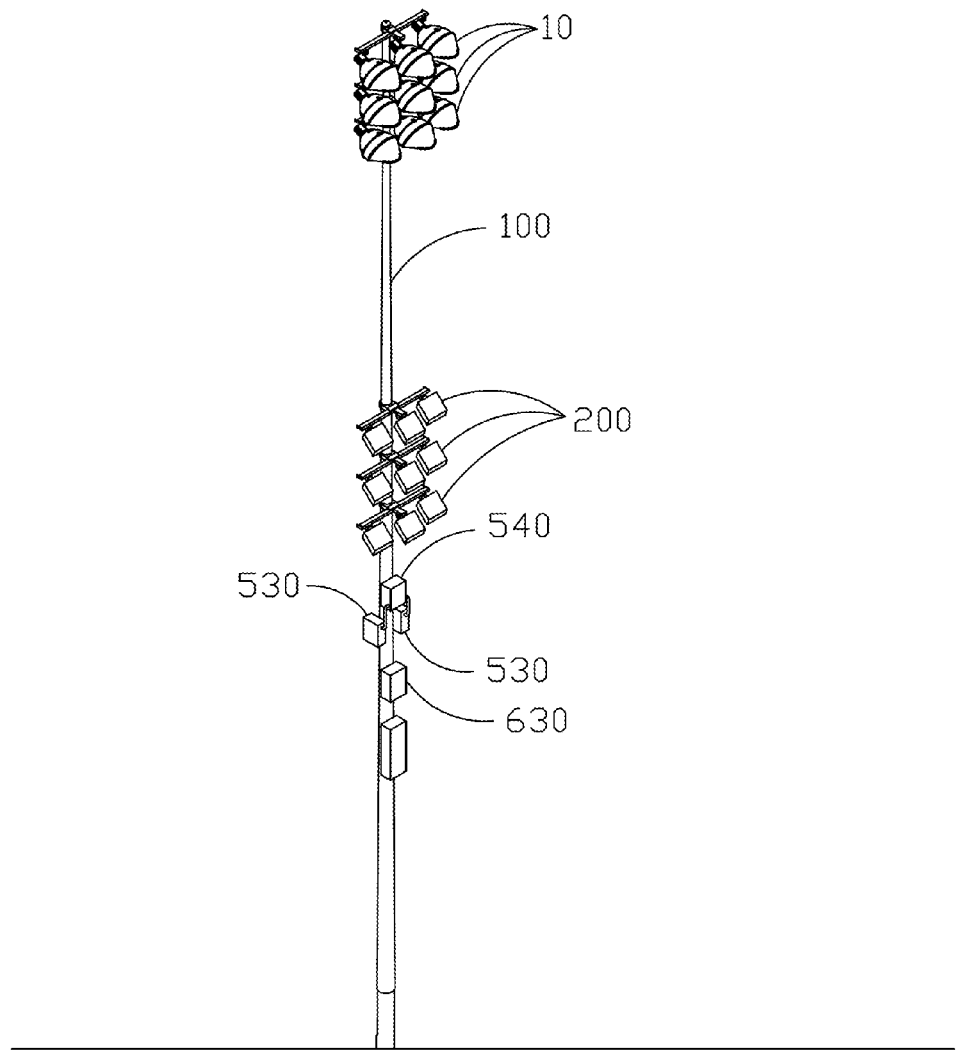

FIG. 5A is similar to FIG. 2A but shows an alternative embodiment of a single pole with more top light fixtures 10 and an array of multiple uplighting fixtures 200, and including an automatic sensing and triggering system for operating the uplights 200.

Figure 5B:
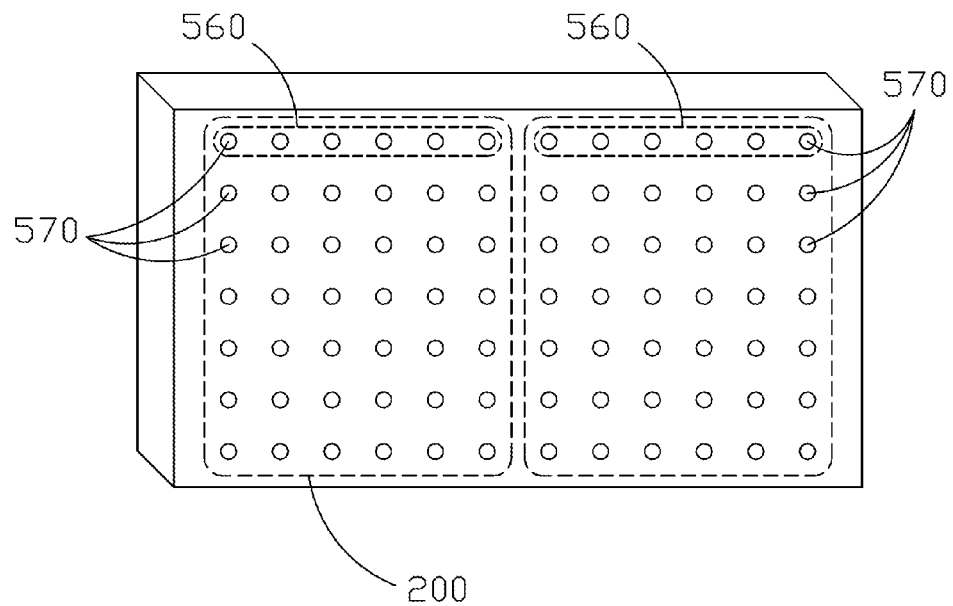

FIG. 5B is an enlarged isolated perspective and diagrammatic view of one of the uplighting fixtures 200 of FIG. 5A, showing fixture 200 can be comprised of a plurality of solid state (e.g., LED) light sources.

Figure 6:
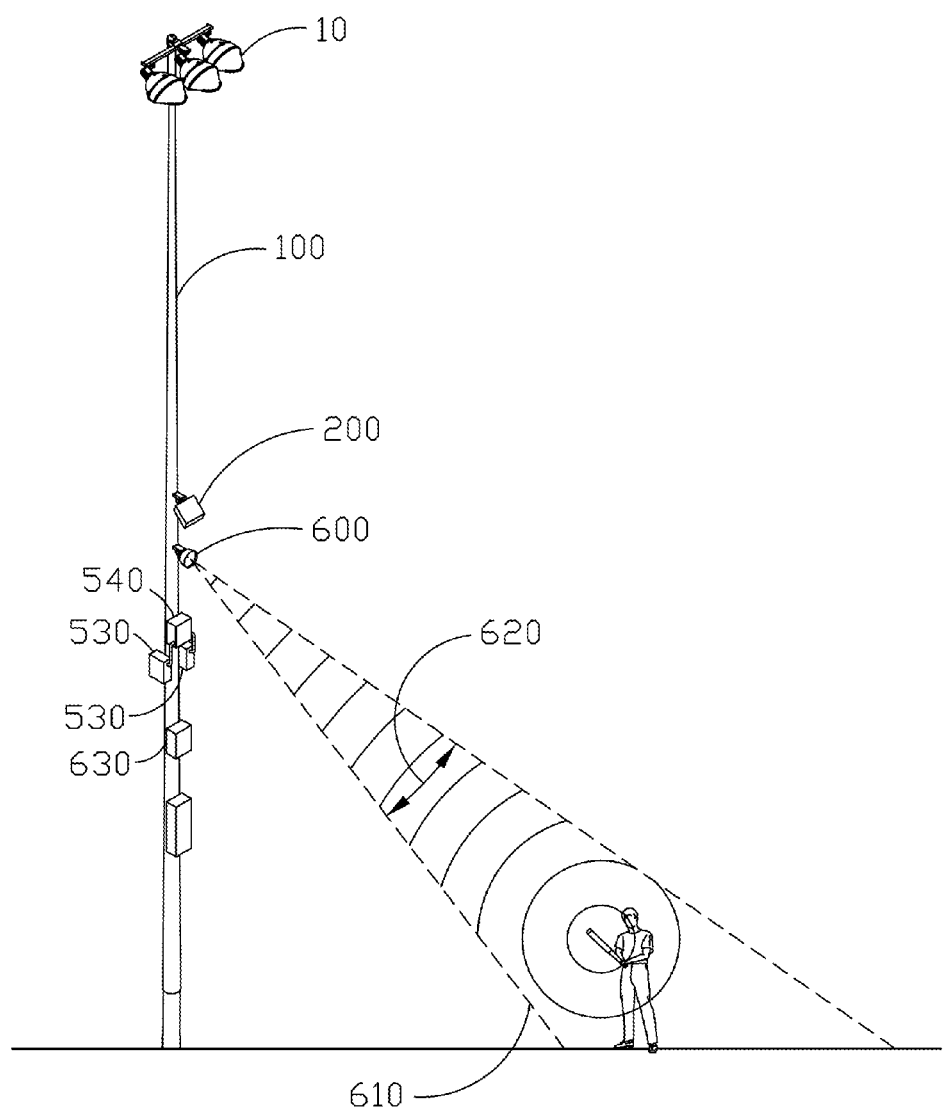

FIG. 6 is similar to FIG. 2A illustrating a pole, top light fixtures with substantially controlled light beams, a sensing and control system for operating fixture 200, and a specific sensor 600 for detecting a condition to trigger fixture 200.

Figure 7A:
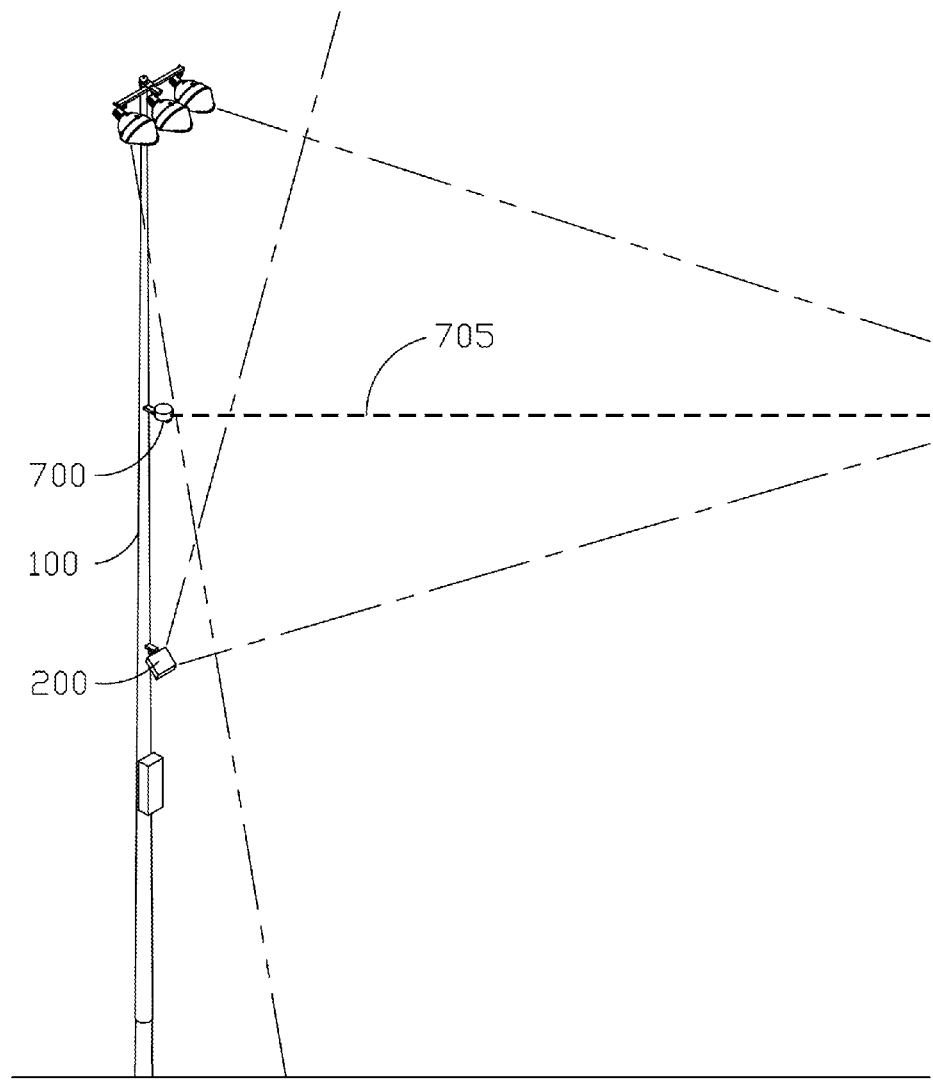

FIG. 7A is similar to FIG. 6 but shows an alternative sensor 700 for triggering operation of fixture 200.

FIG. 7B is similar to FIG. 2B but diagrammatically illustrates operation of sensor 700 for multiple poles and multiple uplighting fixtures 200.

FIG. 7C is similar to FIG. 4B but illustrates an alternative embodiment for a sensor system (video based) for automatic triggering of uplighting fixtures according to an exemplary embodiment of the present invention.

Figure 7D:
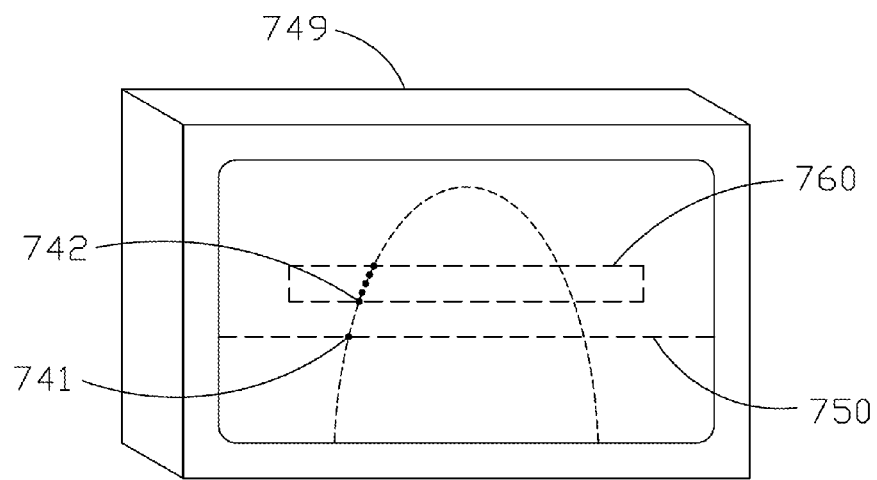
Figure 7E:
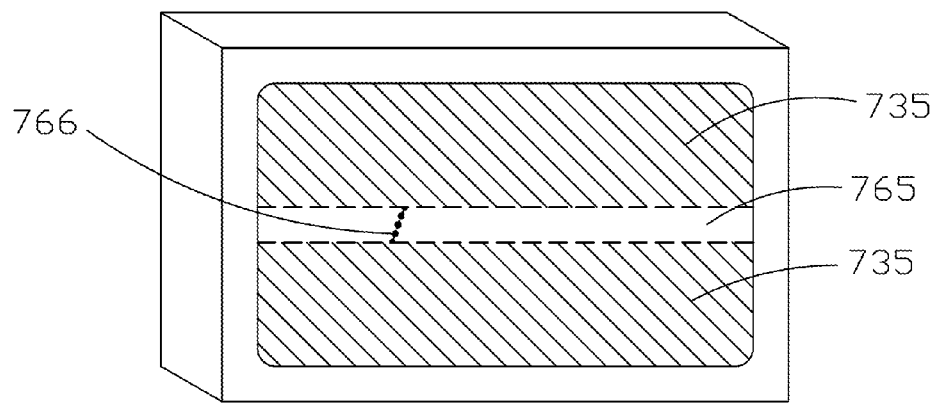

FIGS. 7D and 7E are perspective views of a video monitor diagrammatically illustrating digital image processing could be used to automatically detect and trigger uplighting according to an example of the present invention.

Figure 8A:
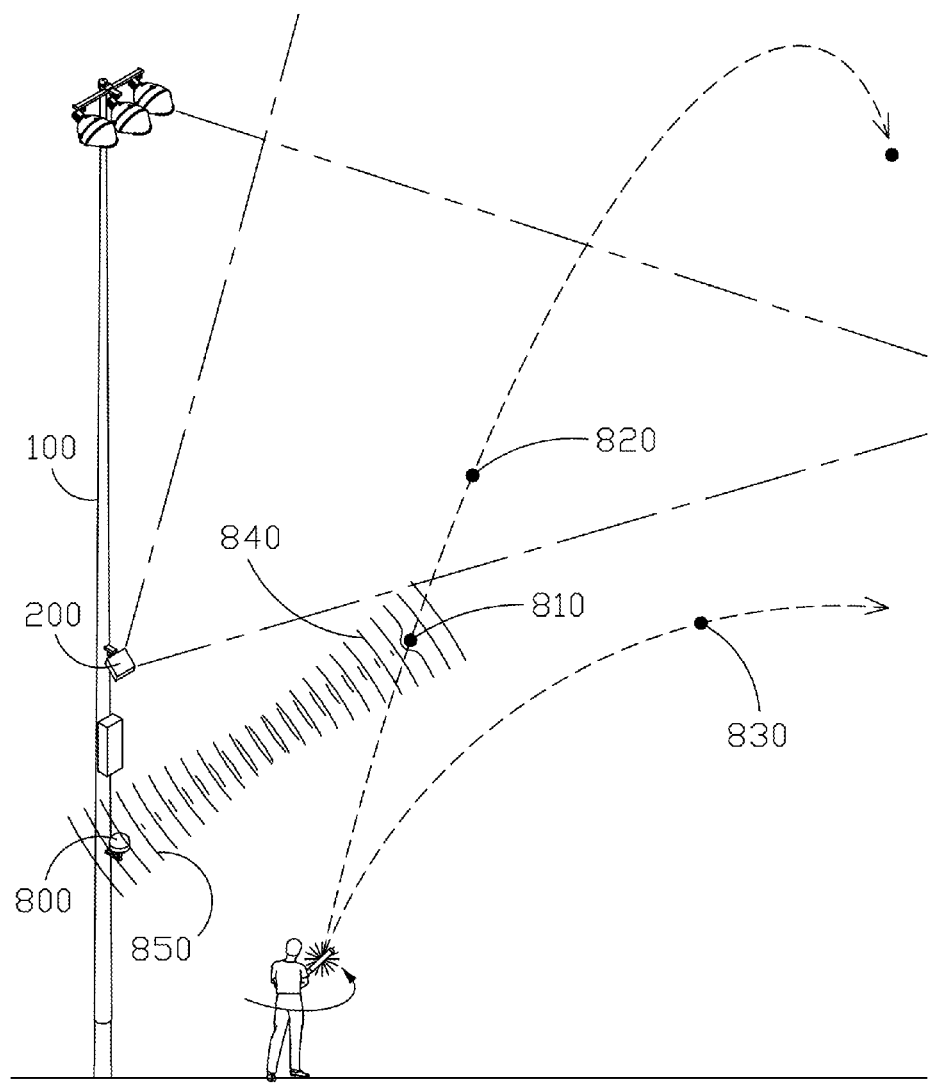

FIG. 8A is similar to FIG. 6 but shows an alternative configuration for sensing a triggering event for uplighting according to an example of the invention.

FIG. 8B is similar to FIG. 7C but illustrates use of the triggering mechanism of FIG. 8A for automatic triggering of uplighting.

Figure 9A:
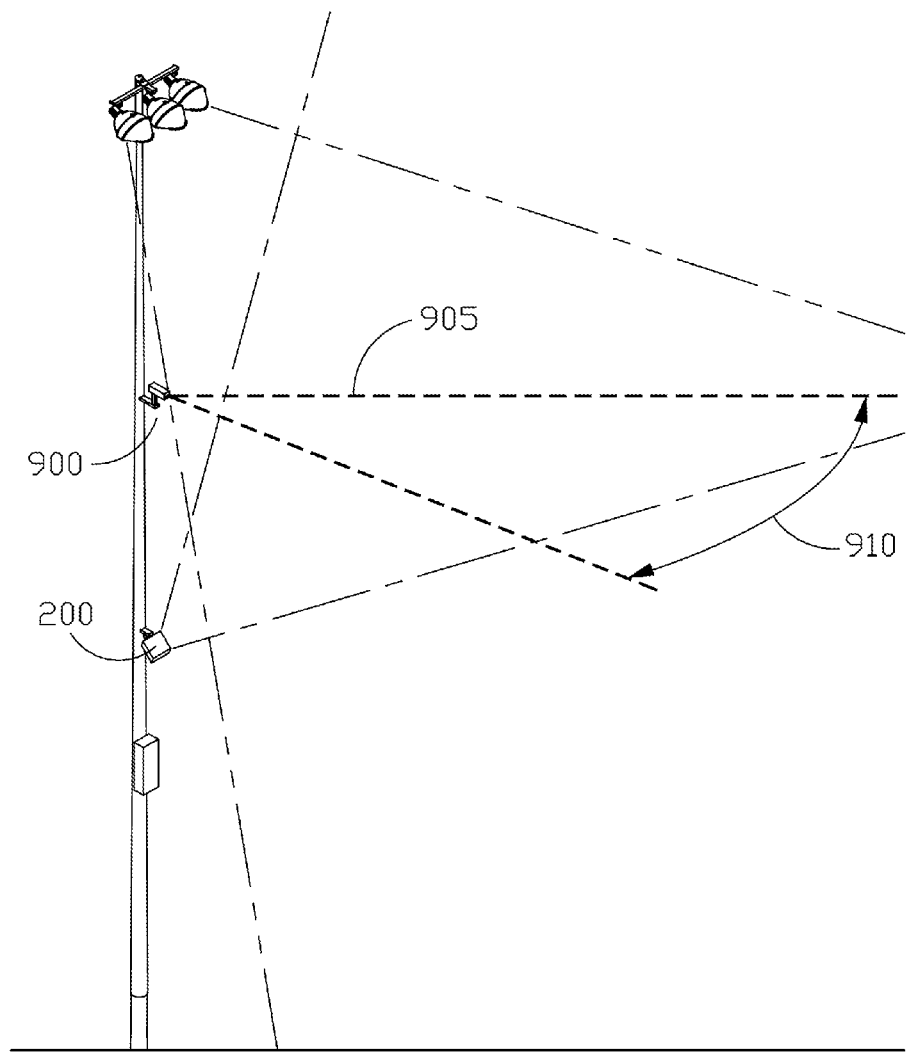

FIG. 9A is a still further alternative embodiment similar to FIG. 7A but showing a different triggering mechanism for automatic and temporary uplighting according to the invention.

FIG. 9B is similar to FIG. 8B showing the triggering mechanism of FIG. 9A applied to a baseball field.

Figure 10:
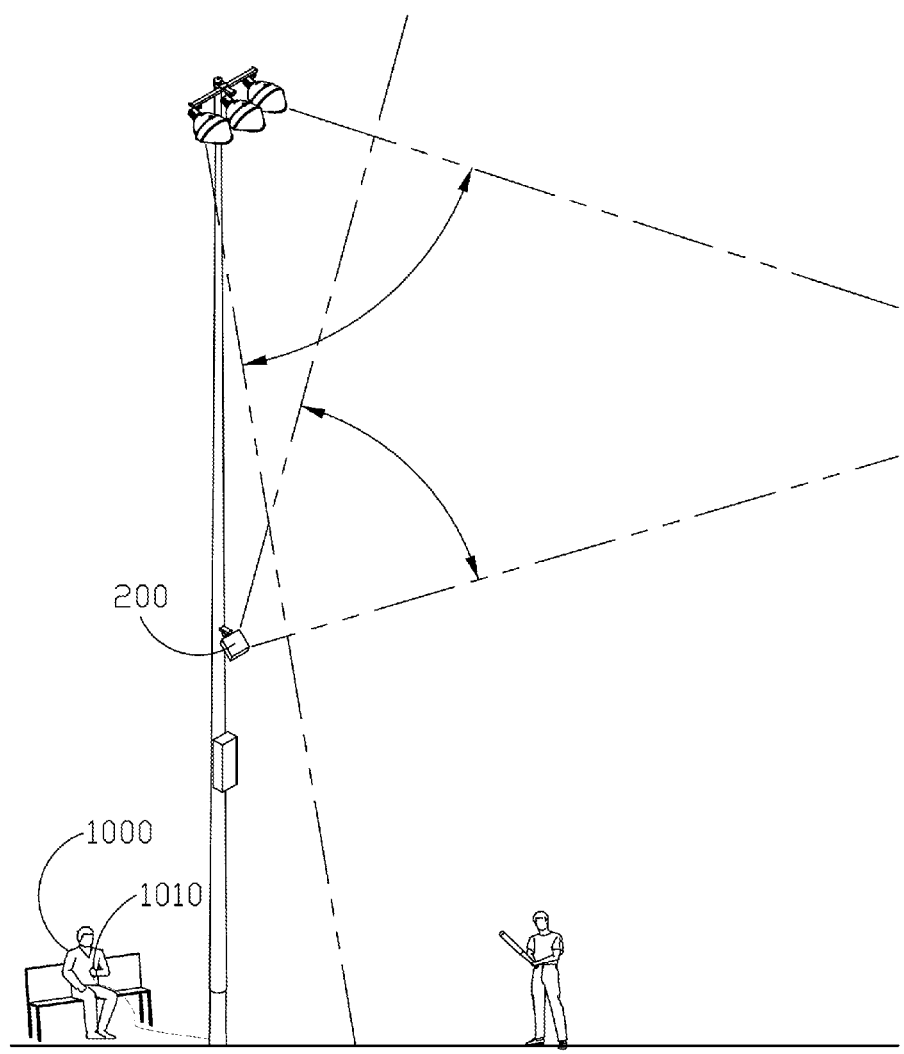

FIG. 10 is similar to FIG. 2A but diagrammatically illustrates a system to allow a human to manually trigger a temporary uplighting with a fixture 200.

Figure 11A:
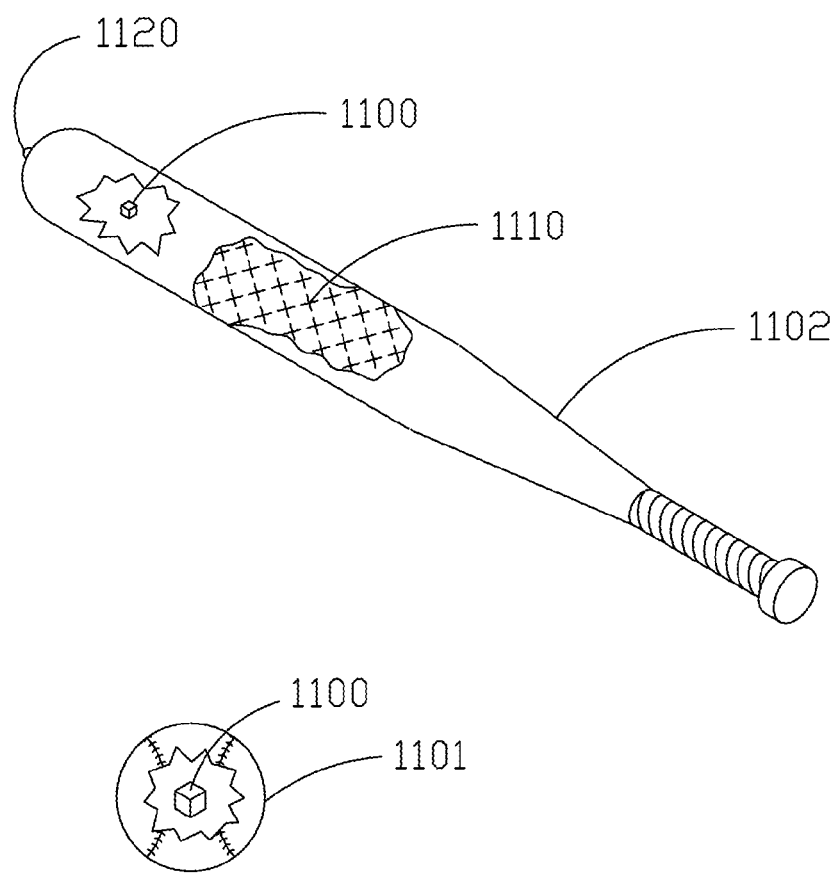

FIG. 11A is a diagrammatic illustration of sporting implements, here a baseball or softball bat and a baseball or softball, including a sensor or emitter in the bat which can wirelessly communicate to a control system movement of the bat indicative of a condition to automatically trigger temporarily uplighting according to an embodiment of the present invention.

Figure 11B:
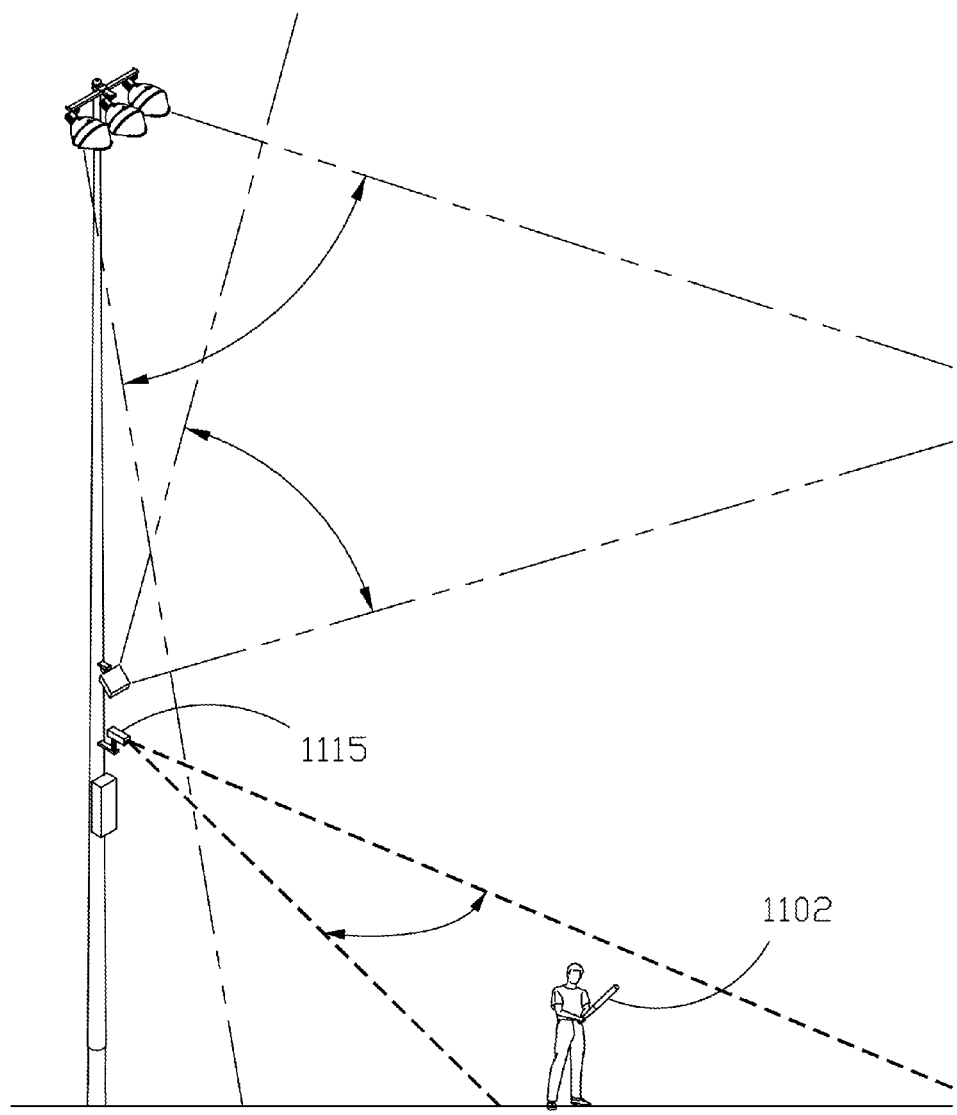

FIG. 11B is similar to FIG. 2A but diagrammatically illustrates a control system to communicate with and/or receive information from sporting implements to automatically trigger temporary uplighting according to an embodiment of the present invention.

Figure 12A:
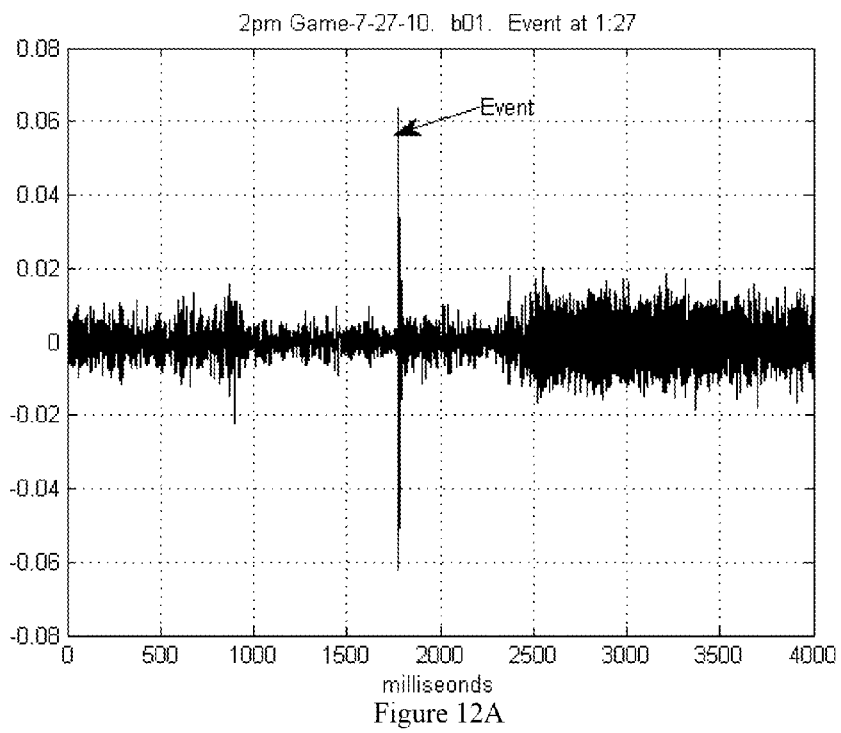
Figure 12B:
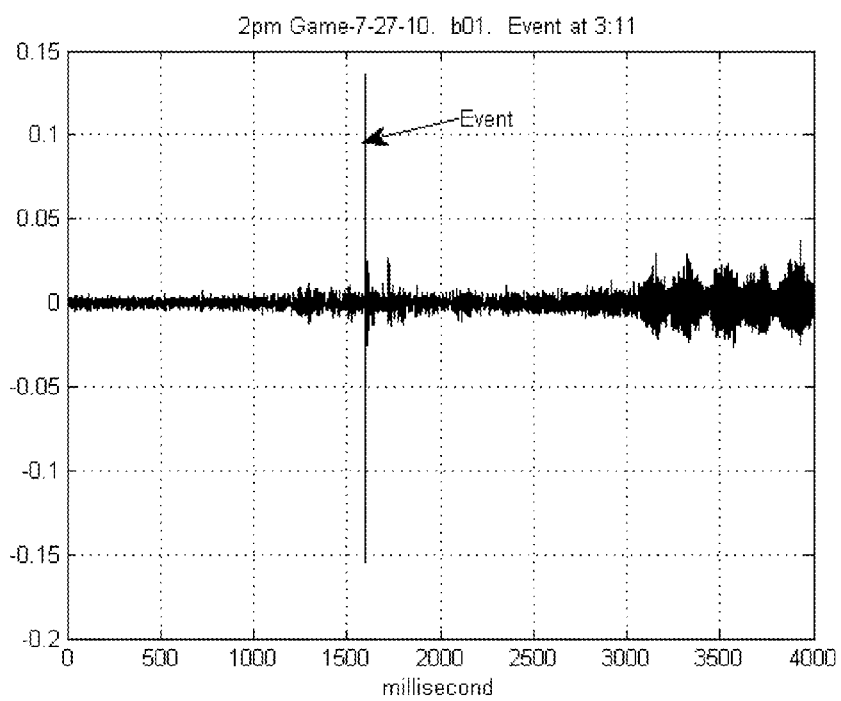
Figure 12C:
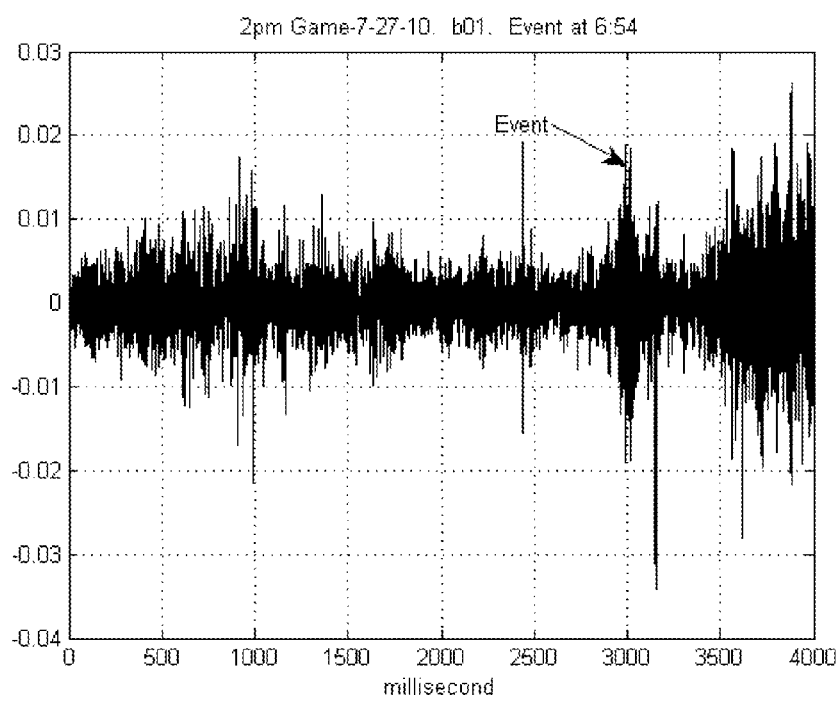

FIGS. 12A-12C represent examples of audio signals over 4-sec intervals related to an exemplary embodiment of the sensing triggering event.

Figure 13B:
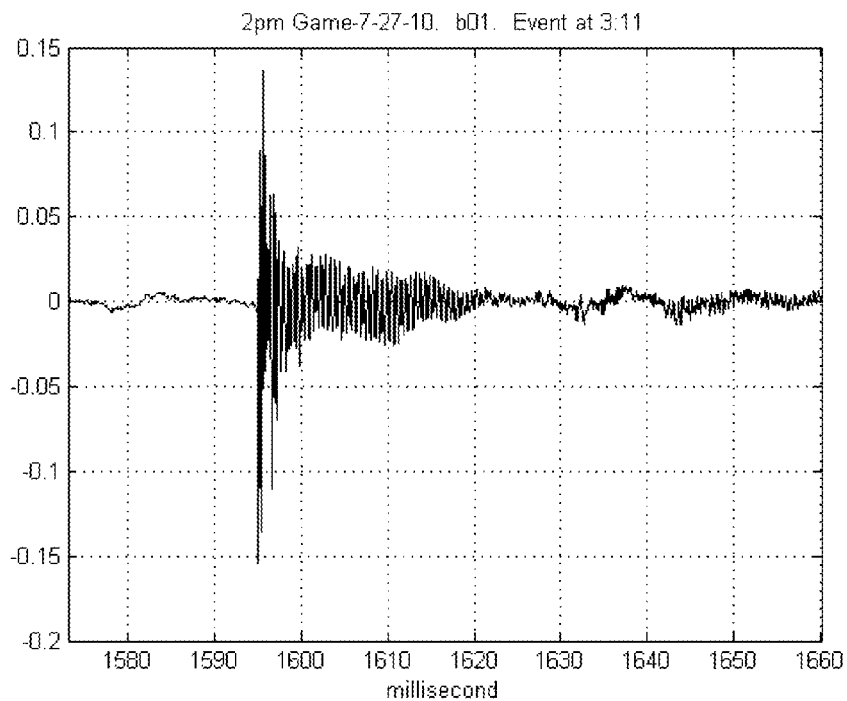
Figure 13A:
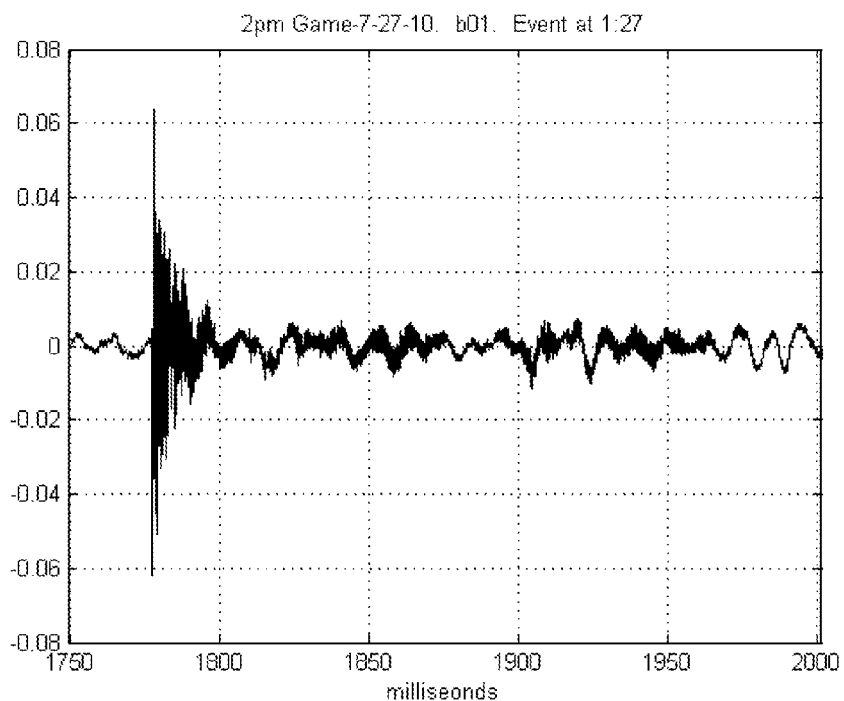
Figure 13C:
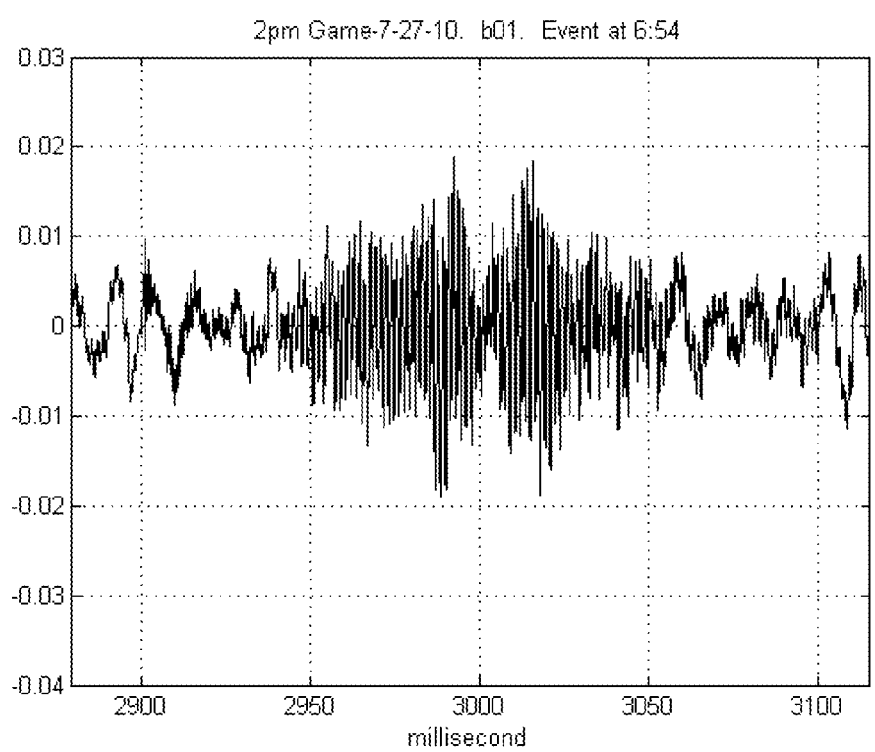

FIGS. 13A-13C represent zoomed plots of the immediate time period of the events of FIGS. 12A-12C.

Figure 14A:
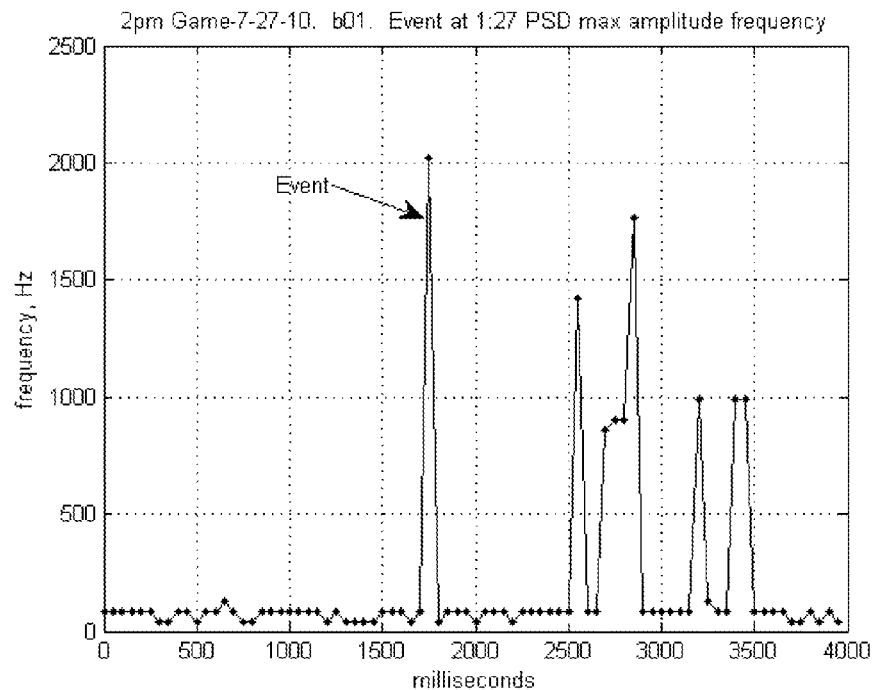
Figure 14B:
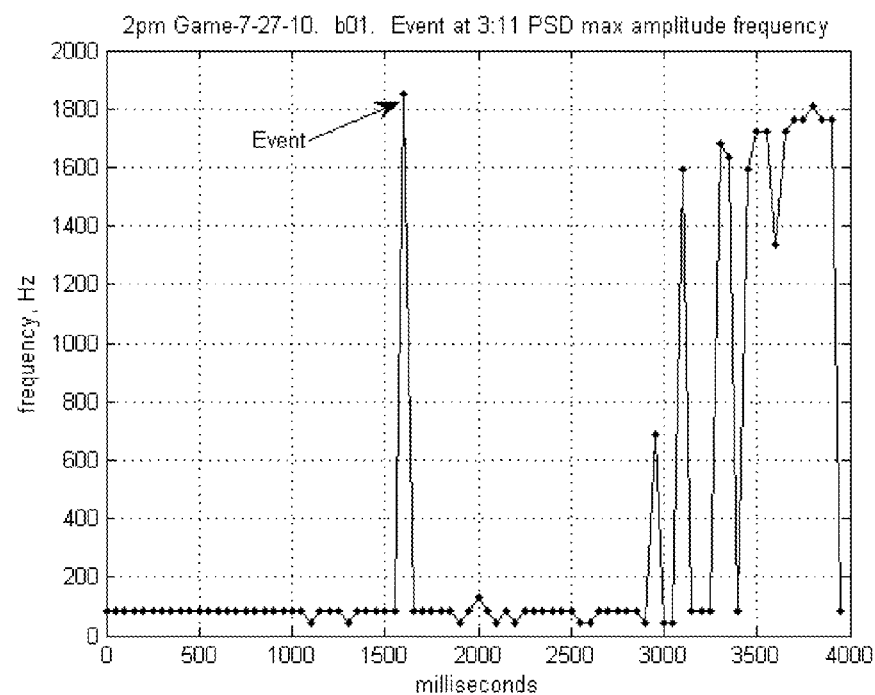
Figure 14C:
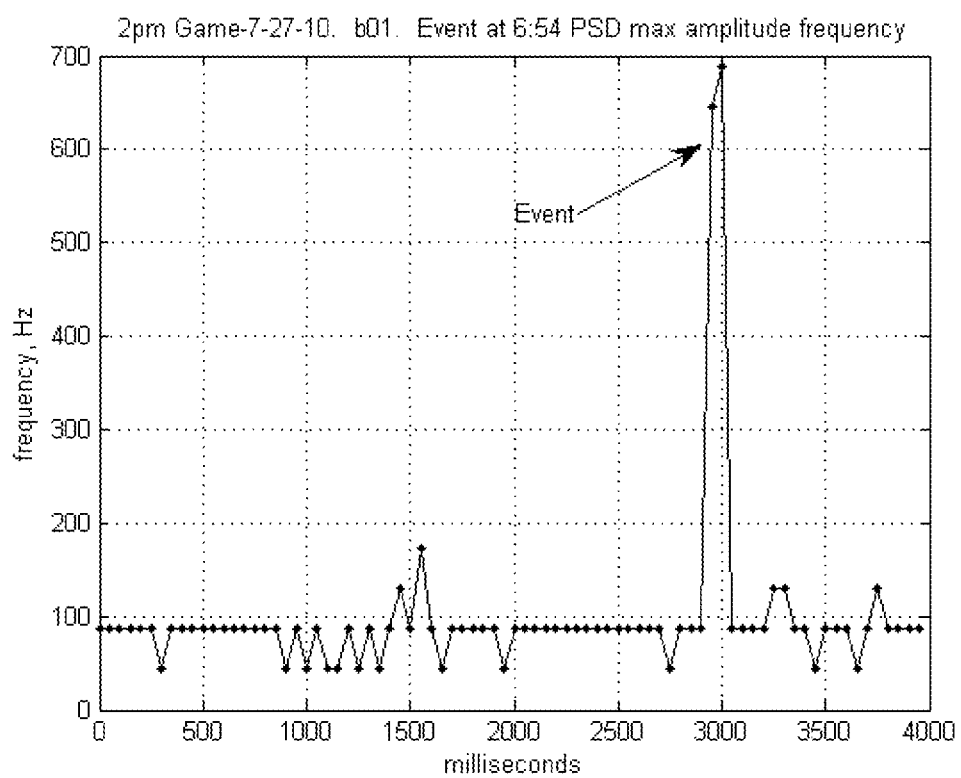

FIGS. 14A-14C show "events" related to maximum amplitude frequencies per a buffer related to FIGS. 12A-C and 13A-C.

Figure 15A:
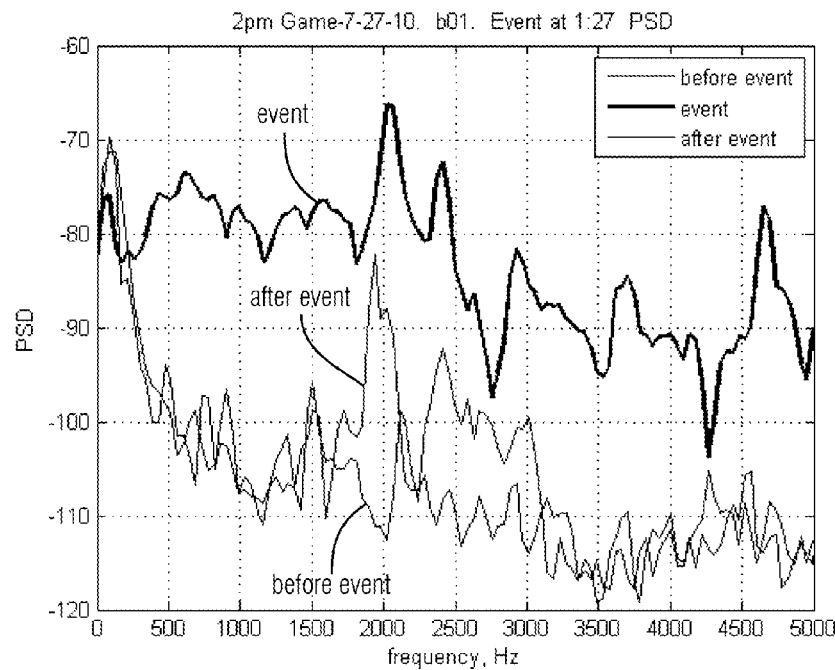
Figure 15B:
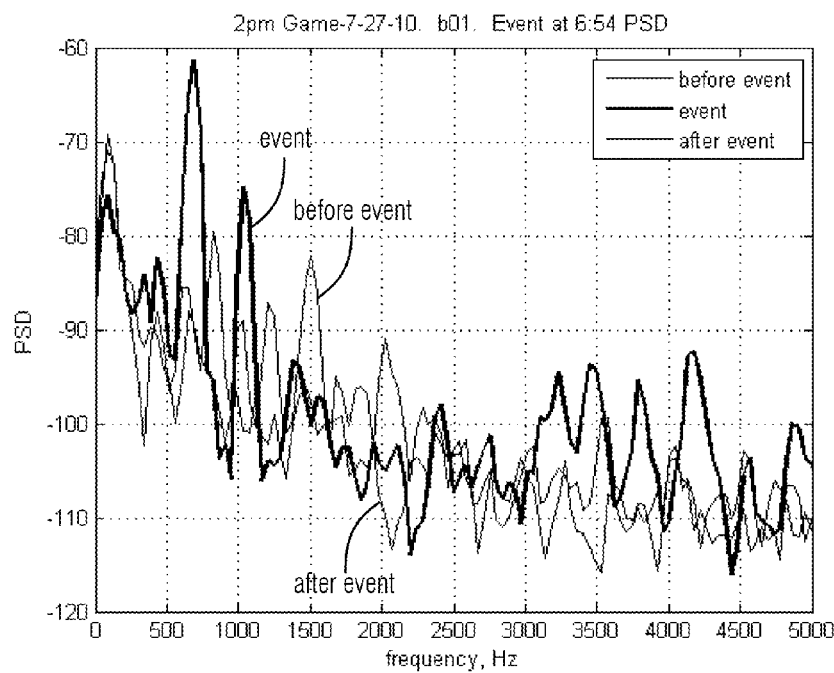

FIGS. 15A-15B show PSD plots for events 1 and 3 derived from FIGS. 14A-C.

Figure 16A:
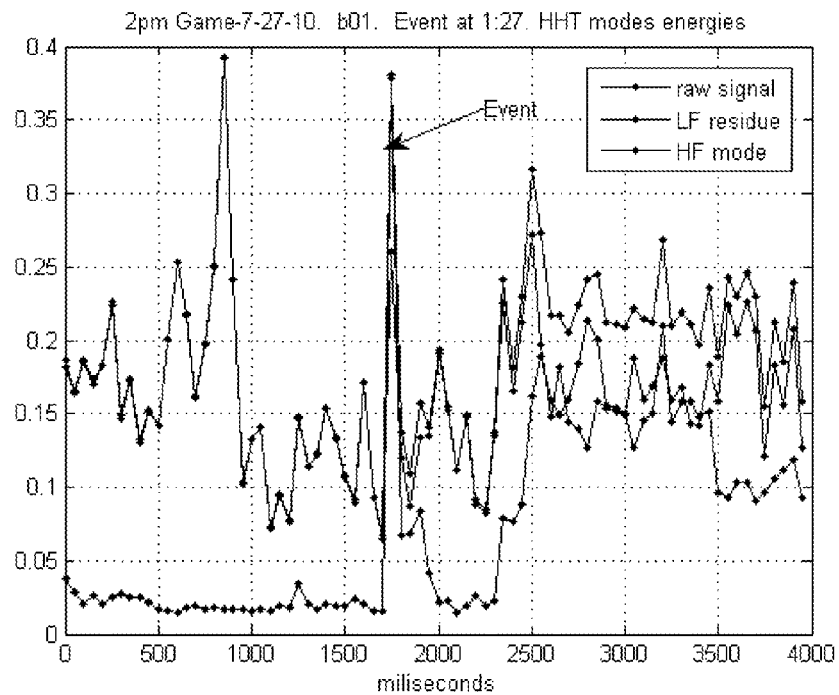
Figure 16B:
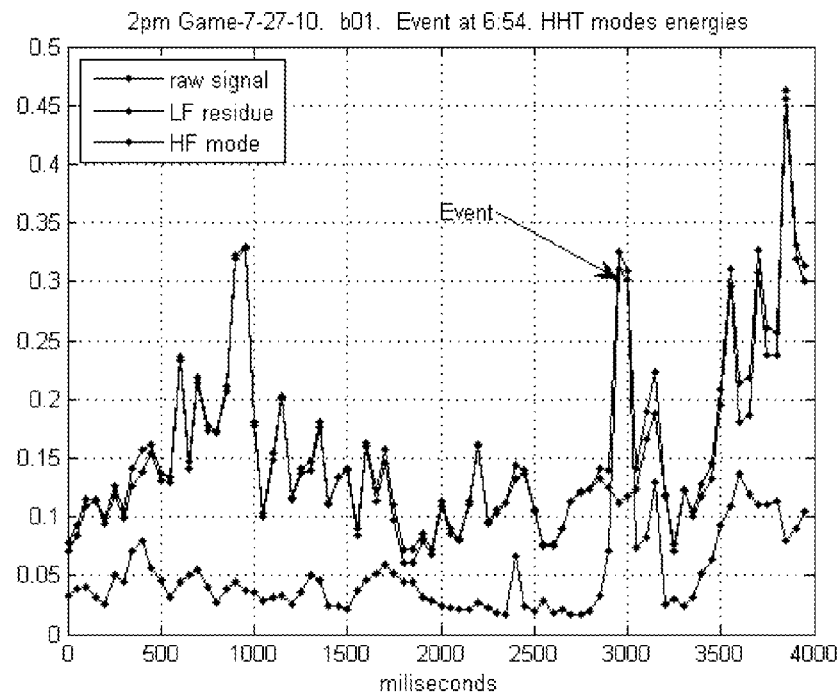

FIGS. 16A-16B show energies per buffer for events 1 and 3 of FIGS. 15A-C.

Figure 17A:
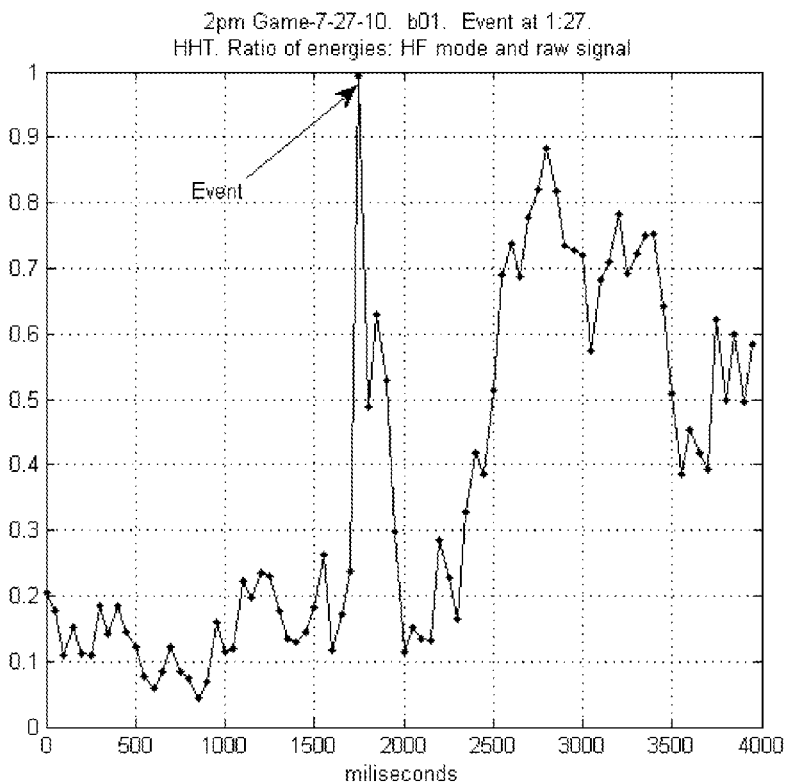
Figure 17B:
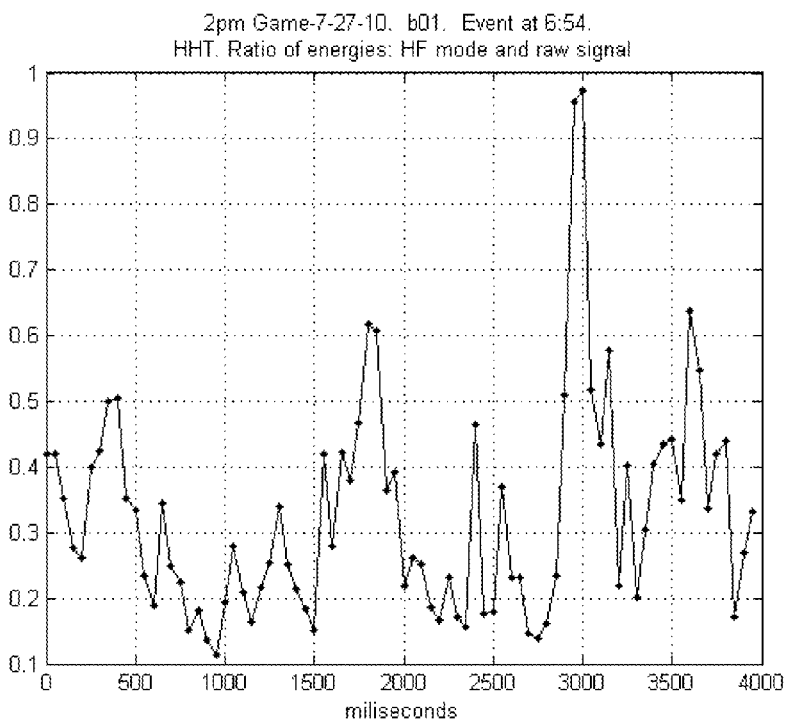

FIGS. 17A-17B show ratios per a buffer.

FIGS. 18A-18D show examples of decomposition before and during events 1 and 3 of FIGS. 15A-C to 18A-D.

Figure 18A:
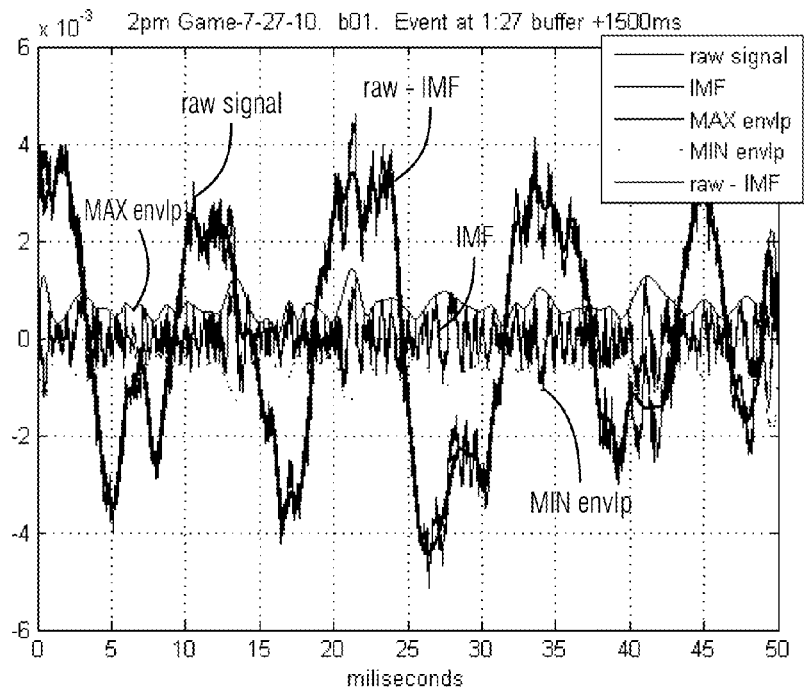
Figure 18B:
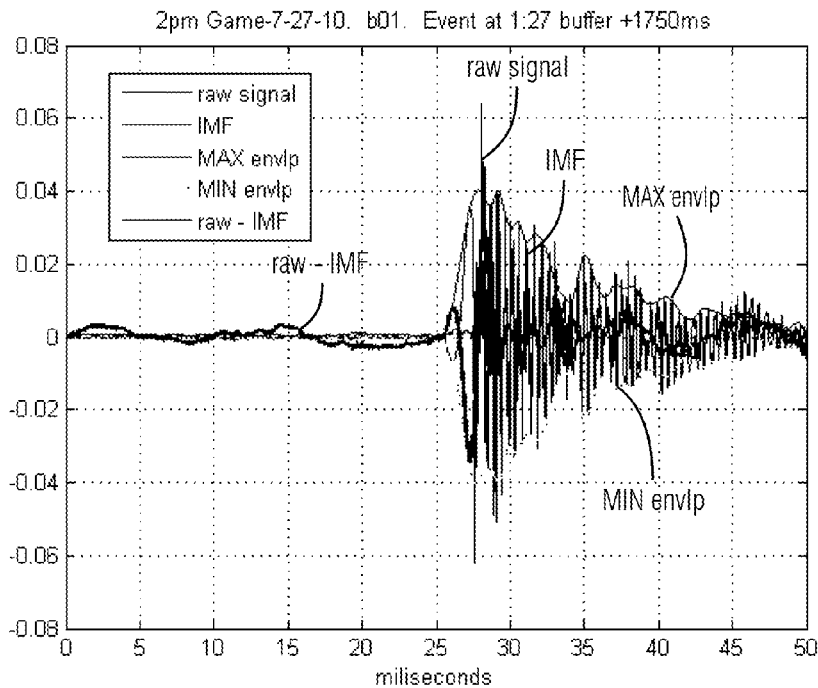
Figure 18C:
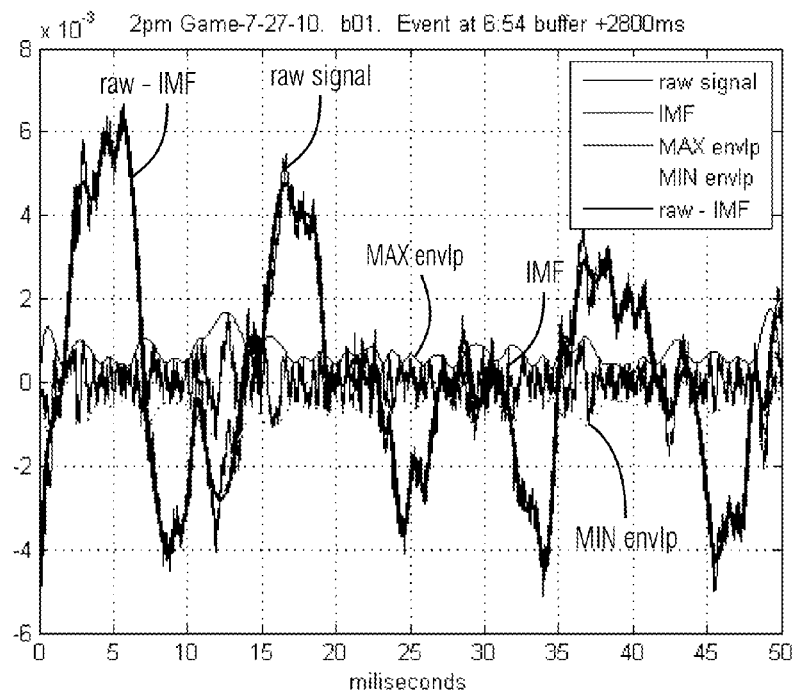
Figure 18D:
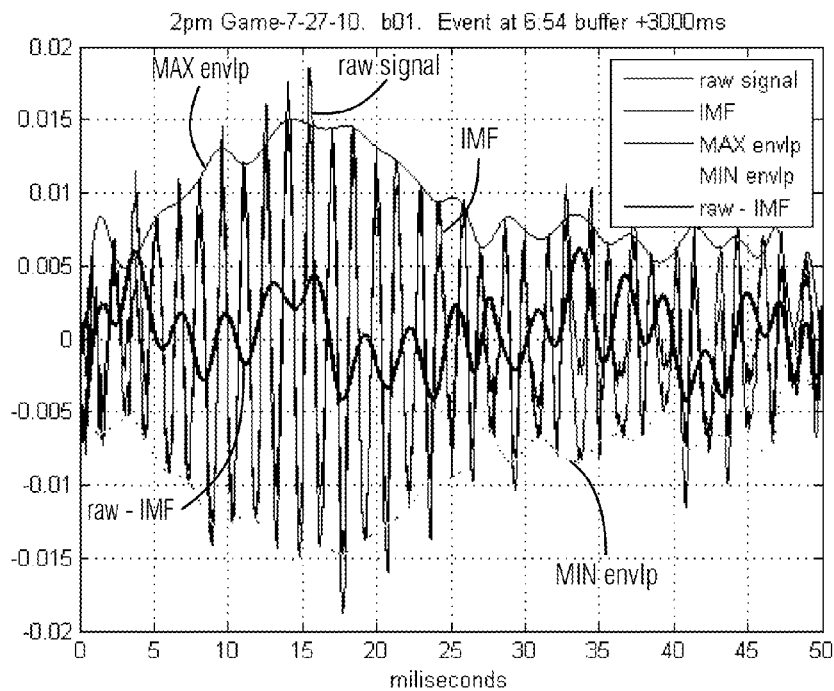
Figure 19A:
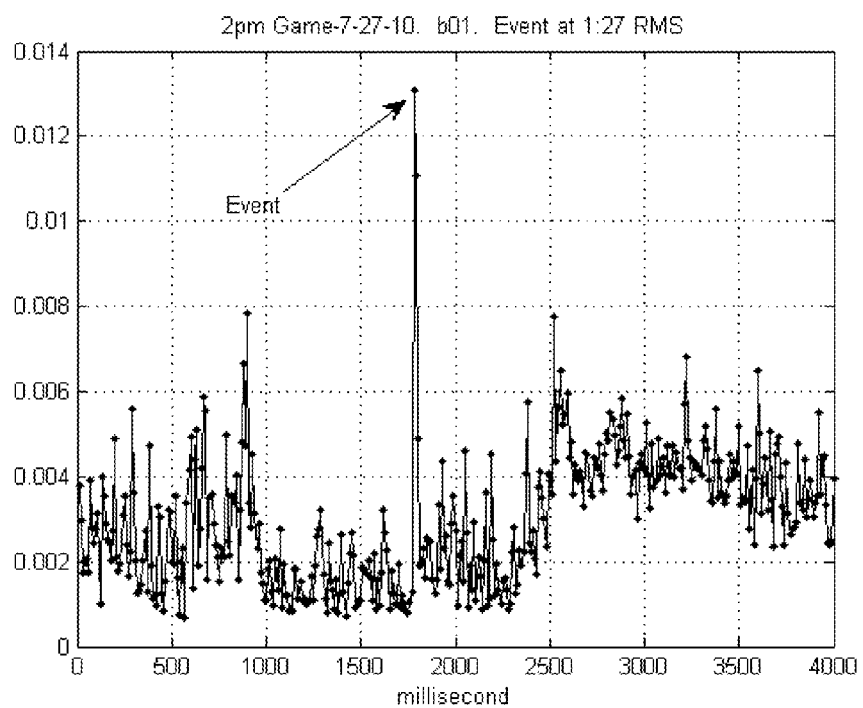
Figure 19B:
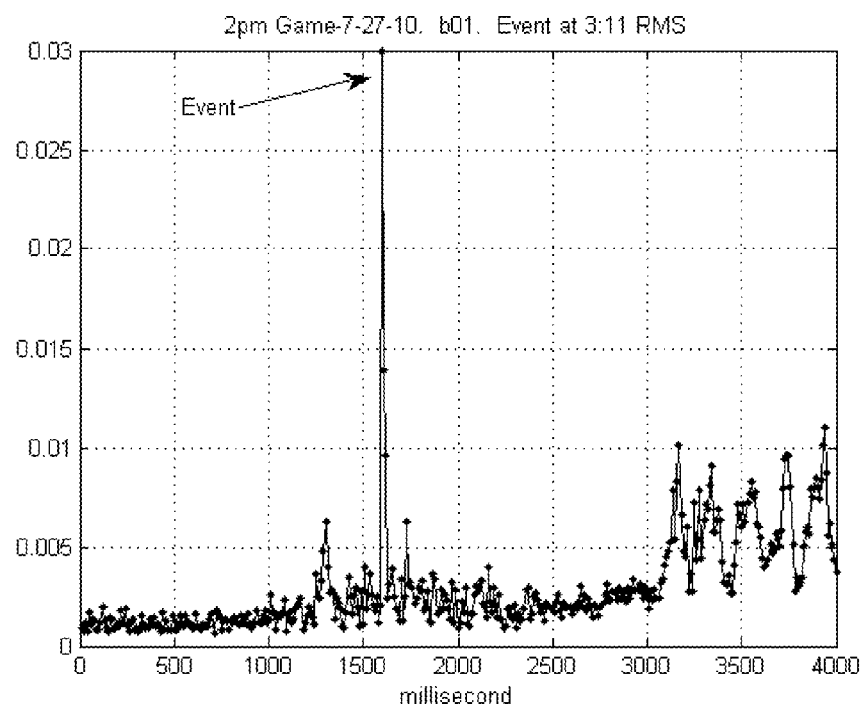
Figure 19C:
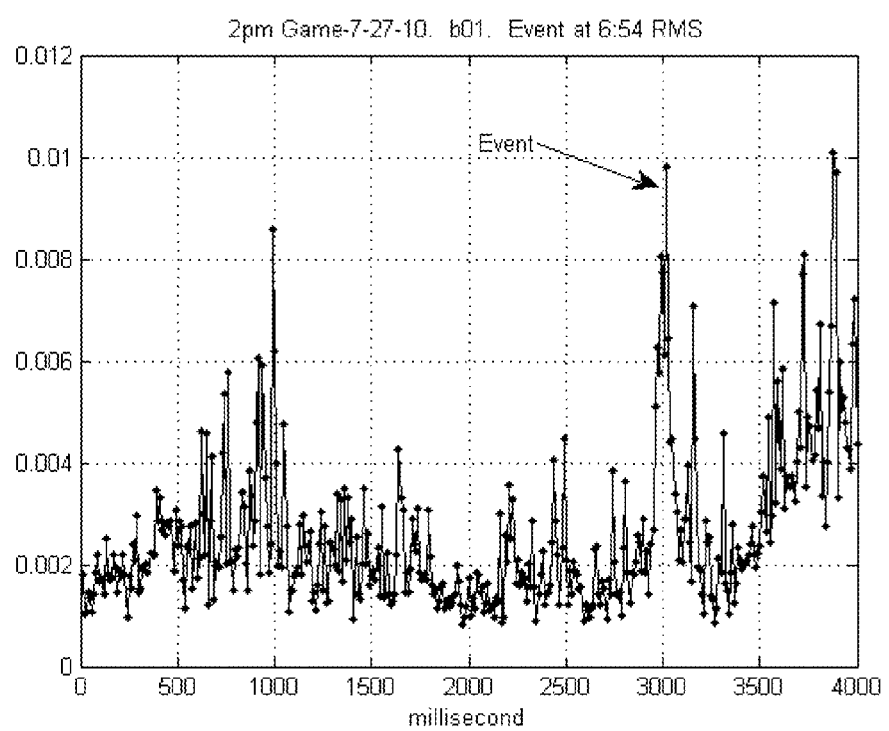

FIGS. 19A-19C show RMS per buffer for events 1-3 of FIGS. 15A-C to 18A-D.

IV. DETAILED DESCRIPTION OF EXEMPLARY EMBODIMENTS

A. Overview

Controlled Uplighting

Figure 1C:
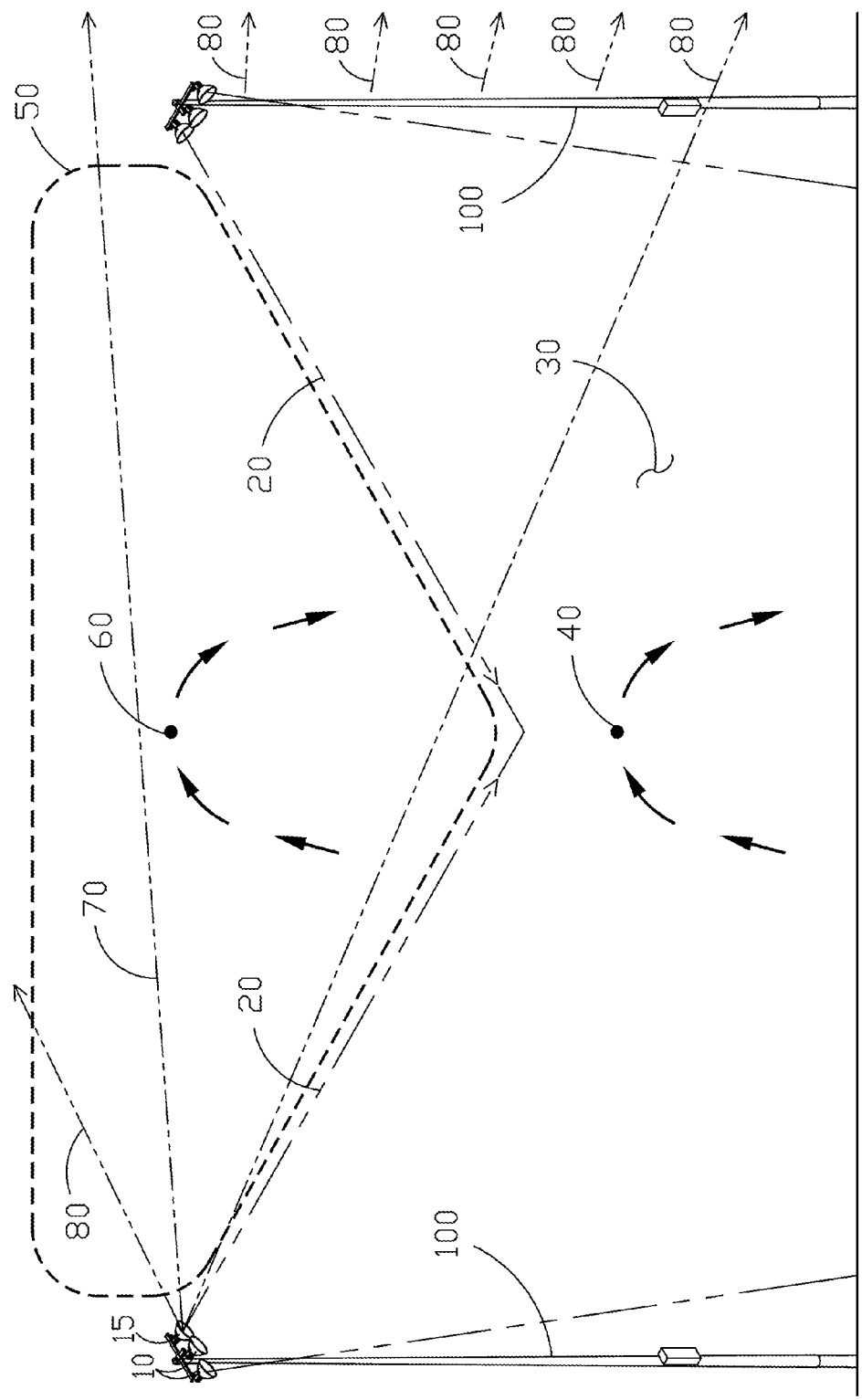
FIG. 1C is similar to FIG. 1B but diagrammatically illustrates conventional sports lighting systems that have less control of light, and thus might provide some illumination into areas 50 but create glare and spill and sky glow issues.

A typical sports field has fixtures 10, FIG. 1A, mounted on poles 100, providing beams 20 (simplified, as seen from the side). For simplicity of illustration, the area illumined by beams 20 is described as combined ground zone 30, FIG. 1B. One example of a light fixture with a highly controlled light beam is commercially available from Musco Sports Lighting, LLC of Oskaloosa, Iowa, USA, and marketed under the trademark GREEN GENERATION LUMINAIRE™ and LIGHT-STRUCTURE GREEN™ ("LSG") System. A ball 40 in relative height near the playing field surface, identified as space 30 in FIG. 1B, is illuminated from above by fixtures 10. Due to the level of control of the beam and the visor design to prevent glare and spill light, resulting dark space or low light space ("fly zone") 50 exists where a ball 60 in play high in the air such as a punted football or a fly ball in baseball cannot easily be seen. In contrast, certain fixtures 15, FIG. 1C, may provide light 70, FIG. 1C (only one side shown for simplicity) helping to illuminate ball 60, but they also cause glare and spill light 80, and are operated continuously rather than only when the ball is high in the air, as the light from these fixtures is primarily designed to illuminate the playing field. Such fixtures may be of a prior technology design such as SPORTS-CLUSTER™ fixture, also from Musco, with limited control of the light beams. Other such fixtures include designs which are modified to allow some light into dark zone 50. Such modifications can include having louvers, baffles, or other modifications in the fixture or visor. An example is the LSG 5" visor, also from Musco, U.S. patent Ser. No. 11/763, 867, which is incorporated by reference herein. Another example is a visor with an aperture to allow some uplight such as U.S. patent Ser. No. 11/333,995, published US 2006/0176704 A1 on Aug. 10, 2006, incorporated by reference herein.

In an embodiment according to aspects of the current invention, aimable fixtures 200, FIGS. 2A and 2B, mounted on poles 100 provide beams 210 (simplified) which provides uplight to illuminate dark zone 50. This provides illumination for a ball in flight but generally not the field, spectators, or other areas. Fixtures 200 provide light from LED or other lighting sources. These lights are activated when triggered by a specific event which indicates the likelihood of a ball entering the fly zone. Such an event could be the sound of a bat hitting a ball (baseball), the sound of a football being punted or kicked (football), or for any sport a ball being detected moving toward the fly zone. The trigger could be based on sensing the event through any of a number of ways, including but not limited to, acoustic, electronic, IR/laser, electromagnetic, or other method, or the lights could be manually triggered. Thus ball 60, FIG. 2B, would be well lit to allow the ball to be played, but with much less glare and spill light, and with only momentary uplighting, thereby saving significantly on electricity cost.

The fixture may be mounted independently at a relatively low height (200, FIGS. 2A and 2B) and aimed generally upwards. The fixture 200 could also be mounted as part of or in close proximity to an existing bank of lights 10, FIG. 2C, on a pole 100, though this will not provide as much reduction of glare and spill light.

If multiple fixtures 200 are used, they may be turned on and off simultaneously, or may be turned on and off individually based on directional information from sensors, human decision, or other factors.

Block Diagram/Operation

Block diagram FIG. 3 illustrates an exemplary mode of operation of the system schematically according to aspects of the current invention. Trigger signal 310 is provided by detection device 300 (e.g., microphone, radar, etc.) or other means. Information from trigger signal 310 is processed by controller 320 (e.g., a programmable digital processor of commercially-available type), which sends a signal to interface 330 (e.g., some type of switch or relay or contractor) which in turn activates uplight illumination 340.

Fixtures

A discussion of uplight illumination requires slightly different concepts than down lighting, since lights aimed up have no ground surface to illuminate. However, in general, lighting 'up' will work similarly to lighting 'down' when considered with comparable light outputs per fixture. The ball in the air must be illuminated as it travels an unpredictable path. If uplight light sources (such as fixtures 200) are aimed analogously to down lights, the ball will traverse an area that provides illumination on the ball at any point in its travels. Thus, similar concepts will be used except for the lack of a static reflecting surface such as the playing field.

Assuming an installation at a typical field, the desired uplight illumination might be approximately 25% of the field illumination. More or less lighting may be acceptable depending on many factors including but not limited to level of play (e.g. recreational vs. competitive or professional, etc.).

In the past, illumination of sports fields such as baseball and football has been the subject of much innovation and has been the impetus for discovering principles of good lighting. In general, lighting must illuminate the playing field, the players and officials on the field, and the ball (e.g. baseball or football) while it is in play. For example, lighting designers have discovered that the size and speed of an object greatly affects the ability of a person to locate and identify an object. Thus objects such as a football or baseball, which are much smaller and can move at high velocities in comparison to a player, are much harder to see under low or reduced lighting conditions. Further, a baseball is much smaller than a football and can travel much faster, making it even harder to see than a football. Therefore, good lighting is necessary in order to be able to see a ball in play.

The action of the players remains in a 'ground zone' that is essentially the three dimensional space defined horizontally by the playing field dimensions, and vertically generally by the height of the players. Thus the ground zone is defined by the playing area up to a height of about ten feet. In contrast, while much of the action of the ball in play is in the ground zone, it frequently is in play in a three-dimensional space (the 'fly zone') having the same extent as the playing field, but ranging in height up to 80 feet or more for a football punt, and even higher for a baseball 'fly ball.' Sports lighting is typically installed on poles on the order of 60 to 70 feet in height, with the lights aimed down toward the field. This provides some illumination in the three-dimensional space above the playing field (effectively making the 'ground zone' somewhat higher), however, in order to illuminate the ball in play high in the air (e.g., in some cases at or above the height of the pole), light from the fixtures would need to be directed more nearly horizontally or at some upward angle. Therefore, lighting which is designed specifically to provide good illumination for the ground zone will typically provide poor illumination for a ball in play in the space that is at some distance above the ground zone. This means that the players and field may be well illuminated by a given lighting installation, but a ball high in the air may be very poorly illuminated. Conversely, if light is directed from (or simply not blocked from) the existing fixtures towards the 'fly zone,' this will tend to result in unwanted side effects such as glare (e.g., perception of harsh lighting), spill (light illuminating non-target areas such as residences beyond the field), and uplight (e.g., light directed toward the sky which contributes to sky glow).

Sports fields are typically illuminated with HID fixtures which have an efficiency of approximately 100 lumens per watt, using approximately 1.6 kW per lamp, resulting in a light output of approximately 160,000 lumens per lamp. Each lamp is contained in a single fixture. LED lights currently have approximately the same lumen output per watt, but due to their size, must be aggregated into fixtures with many LEDs in order to provide similar lumens per fixture. Normally, even a large number of LEDs in a fixture cannot provide equivalent lumens per fixture compared with an HID fixture, since the wattage per LED has to be limited to approximately 1 watt per LED in order to avoid overheating. This would require 1,600 LEDs in a fixture to equal the luminous output of a single HID lamp. However, LEDs which are operated for a short period of time may be overdriven with significantly more power, which could be on the order of 2-5 times as much power, giving them approximately 2-5 times as much light output per LED. Thus a fixture of 80 LEDs overdriven to 5 watts per LED for a short period of time could provide approximately 40,000 lumens, 25% of the output of a typical HID fixture.

Sports fields are typically illuminated by mounting several HID fixtures on each of several poles which are arrayed around the field. For instance, a typical football field, FIG. 4A, may have four poles 100, FIGS. 4A and 5A. In one example, each pole has nine HID fixtures 10. This arrangement provides an average illumination of approximately 50 fc (foot-candles) on the surface of the field. Given a light output from a single LED fixture 200, FIG. 5A, of 25% of an HID fixture, it is therefore possible, using the same number of LED fixtures per pole, to provide momentary uplight illumination (e.g. on the order of 10 seconds per trigger event) equivalent to 25% of the downlight level. Thus a field lit at 50 fc by four poles each having 9 HID fixtures could be provided with 12-13 fc equivalent uplight illumination from 9 LED fixtures on each of the four poles. This level of illumination may be quite adequate, and may be much more than is needed, to provide sufficient uplighting for a ball in play in the air, particularly since the ball will be lit from the underside which will contrast starkly with the dark or black sky. (Actual light levels required or desired on a given field will vary depending on field location, type of sport, age/competitive level of players, needs for broadcast lighting, etc.)

An LED used in continuous duty can be limited by the ability of the fixture to remove heat from the LED such that the junction temperature stays below a critical level. Above this critical temperature, the longevity of the LED is reduced due to thermal degradation. In steady-state operation, a relatively stable percentage of the power consumed by the LED is converted to light, with the remaining being converted to heat. Therefore junction temperature of the LED is a function of the amount of power consumed by operation of the LED with respect to the quantity of heat rejected to the LED's surroundings. LEDs are rated with respect to allowable power usage as well as allowable junction temperature which may be plotted versus expected longevity. Some LEDs are rated to consume approximately 1 watt, with a fixed percentage of this power being continuously rejected by a heat sink or other cooling apparatus.

LEDs operated on a limited duty cycle can operate differently with respect to the maximum allowable junction temperature than LEDs operated on a continuous duty cycle. The LED can be operated briefly at a much higher power before the maximum allowable junction temperature is reached. If a heat sink or other apparatus with a high thermal mass is thermally connected with the LED, this time period may be significantly increased. Thus, an LED which would normally operate at 1 watt continuous could operate at a power rating of on the order of 5 watts, given sufficient thermal mass and a sufficiently reduced duty cycle. This type of application is well-suited to an embodiment which operates LED fixtures intermittently for time periods on the order of 10 seconds. Additionally, a much higher level of overdrive may be available based on improved cooling methods.

In operation, one embodiment would use a 1.6 amp current at a 3.1 V drop across each LED. This would provide approximately 5 watts each (1.6 A×3.1 V=4.96 W). Each string 560, FIG. 5B, of 6 LEDs (ref. no. 570) would consume 30 W, so a fixture with 14 strings would consume 420 watts and would require approximately 23 amps at 18.6 volts. A single pole grouping having 9 fixtures would consume 3780 watts when operating and would need 210 amps at 18.6 volts. Many other configurations and groupings of LEDs, and strings of LEDs, are possible as well.

Vehicle starting batteries provide very high amperage available for up to 30 seconds and the ability to be used in repeated charging cycles. Since this embodiment envisions operating the LED fixtures for short durations, on the order of ten seconds per trigger event, vehicle starting batteries, or other batteries having similar characteristics, could easily be used as power sources for this application. For example, two typical starting batteries in series, each having a "cranking amps" rating of 500 A @ 10 V for 30 seconds would easily provide a discharge of 250 A @ 20 V (exceeding the calculated 210 amps and 18.6 volts requirement) for any foreseeable duration of intermittent uplighting.

LED lights may be set up and powered in many different ways. Sufficient AC power may be available from existing connections, or by new installation. Another source of power would be to use DC storage batteries, such as automotive batteries. For example, two 12 volt batteries 530, FIG. 5A, are placed in series, and connected with an LED driver in enclosure 540 in or near the fixtures 200.

Assuming that the lights would operate a maximum of 10 seconds at a time, with 2 minute minimum between operation cycles, or no more than six times in three minutes, a charger (not shown) mounted in enclosure 540, FIG. 5B (or at another convenient location), that delivered ⅙ of the output current (⅙×210=35 amps), at 24 volts might require an input of 240 V @ 6 amps. The batteries would discharge 2100 amp-seconds (@ 18.6 V) in a 10 second ON time, and the above described charging system would supply 2100 amp-seconds (60 seconds×35 A). Transformer efficiency, battery charging power loss, and other factors would influence the size of charger and current supply needed at 240 V, but given the ease of supplying a 15, 20, or 30 amp circuit at 240 volts, it is quite feasible given existing technology to supply the 'burst' of current needed for intermittent up lighting without installing additional heavy duty wiring that would be required for continuous lights.

Other power supply methods are possible, for instance using higher voltages and longer strings of LEDs. Other discharge/charge duty cycles could be used. Advances in LED lighting efficiency or battery technology, or the availability of commercially viable ultracapacitors or fuel cells would provide useful technology as well.

Similar methods could be used for other lighting projects. For example, FIG. 4B illustrates a baseball or softball field instead of the football field of FIG. 4A. But, by using the methods and concepts described with regard to FIGS. 4A and 5A-B, the six-pole baseball lighting system of FIG. 4B, or other lighting projects, can be designing to provide momentary up-lighting in an effective and efficient manner.

B. Exemplary Method and Apparatus Embodiment: Baseball or Softball 'Hit' Events Using Sound Triggering System A detection device 300, FIG. 3, could be a directional microphone 600, FIG. 6 such as, e.g. "Sound & Optics 10" Parabolic Acoustical Listening Device (PALD-10)" available from Sound and Optics Systems, 7349 Via Paseo Del Sur, Suite 515-102, Scottsdale, Ariz. 85258." This microphone may be located on a pole 100 or other structure and aimed at batting zone 610 (as an example of a "target"). Microphone is highly directional, having an effective listening angle 620 of a few degrees. Sounds from the microphone are directed to a digital or analog processor (e.g., controller 320 of FIG. 3). The processor uses pattern matching, band pass filtering, or other strategies to discern a probable hit. The processor then activates the uplight illumination (such as via fixture(s) 200), through an interface using e.g. standard electrical relays and or contactors (e.g., interface 330 of FIG. 3) for a period of time (e.g., for baseball) on the order of 5-10 seconds. Processing software in processor 320 would be calibrated towards responding positively to 100% of hits, since the cost of a 'unintended trigger' (i.e. indicating a hit due to a ball hitting a glove or other extraneous sound) is negligible compared with the negative effects of failing to correctly illuminate a ball in play.

Triggering using the acoustic signal from a bat hitting a ball involves several considerations. First, baseball or softball bats are commonly made either of aluminum, wood, or composite (e.g. graphite or other material). The sound characteristics of an aluminum bat hitting a ball are fairly easily identified. Their sound is a distinctive 'ping' having a fundamental frequency around 2000-2500 Hz which is easily profiled. Wooden bats have a fundamental mode approximately 179 Hz and a second, third, and fourth modes approximately 582, 1181, and 1830 Hz. Since the sound of wooden bats is more similar to other common sounds such as a ball striking a mitt, it is therefore more difficult to profile. However, given these materials, the harmonics should be significantly different from other sounds, and should be identifiable without having an unacceptably high level of 'unintended triggers'. Composite bats are less well known but should have similar acoustic characteristics (or characteristics which can be reasonably differentiated from other sounds).

A strategy for identifying ball hits is to filter the raw signal using both a band pass filter to reduce background noise and sound spectrum analysis which identifies characteristic frequencies and amplitudes. A scoring system could identify, for example, two or more characteristics matching a bat type. A few examples include, but are not limited to, having high amplitudes around 179 and 582 Hz, having low amplitudes in frequencies known to be uncommon for all bat types, and matching at least one additional frequency would be one method of indicating a bat hit. Others are, of course, possible.

When analysis indicates that a ball has been hit by the batter, the controller 320 turns on the uplight fixture(s) 200 through an interface 330 (FIG. 3). In one embodiment, the controller 320 closes a low voltage digital circuit, operating an interface device 330, such as a small relay, which would in turn provide a control signal to contactors which provide current to the uplight fixture(s) 200. The control system 320 would turn on the uplight fixture(s) 200 for an interval that could be included as a constant within the control system (e.g., FIG. 3), could be controlled as a variable by the operator of the system, or could be determined by the control system based on factors such as magnitude or frequency characteristics of the monitored sound. The control system could be included in housing 630 (FIG. 5A), or it could be incorporated into the microphone (or other sensor) assembly or into other existing housings or boxes.

Sound triggering could be used in football or other sports, depending on whether the probability of a ball going into play in the fly zone is normally preceded by a sound that could be sufficiently characterized to be distinguishable. Even very poor discernment, resulting in a very high percentage of unintended triggers, would still provide benefits over existing technology, since a large percentage of the time the lights would still not be on. And, triggering of uplight, including when not needed, does not produce significant glare or spill light such that it would not disrupt players' or fans' view of the game.

C. Exemplary Method and Apparatus Embodiment: Specific Sound Triggering Methodology The preceding exemplary embodiment is described in terms of general principles for sound triggering. One method for improving sensitivity and reliability of triggering is described herein.

Analysis of sound frequencies from trigger events such as a bat striking a ball such a softball or baseball has shown several factors to be of interest in determining if the trigger event has occurred. One very significant factor is the type of bat used. Aluminum or composite bats have been found to have a much more identifiable frequency signature than wooden bats—which may informally be described as a 'ping' sound vs. a 'crack' sound. The frequency signature from a wooden bat striking a ball is rather similar to the sound of a ball striking a player's leather glove. This makes the likelihood of 'false positives' much higher in games where a wooden bat must be used (such as e.g. professional baseball). Or it may require the level of sound processing to be much more sophisticated than for "school level" games where aluminum or composite bats are used. However, ability to detect trigger events may be satisfactory in either case, based more or less on the financial considerations for lighting professional game events vs. school level events. Professional stadiums may also be more likely to have sufficient illumination in the lower level of the fly zone where less powerful (and therefore harder to detect) hits would send the ball. More powerful hits that send the ball high in the air tend to provide greater sound amplitude, such that when response of the lighting system is critical, there is a very high likelihood of successfully detecting the trigger event. In any case, due to the design of LED lights, there is virtually no penalty for 'false positive' events where a ball hitting a glove triggers the uplighting. The small amount of unnecessary uplighting in comparison with the constant level required by non-triggered lighting systems would cost very little in electricity and would still be a considerable improvement over existing systems.

Specific embodiments according to aspects of the invention rely on analysis methods and techniques in order to identify a trigger event. These may include (but are not limited to) pattern matching sounds, determining likelihood of positive detection, estimating detection delay, and considering the effects of noise on sound pattern processing.

In general, one exemplary trigger event detection procedure is as follows: First, audio signals are analyzed within a set of sequential time windows. A finite set of parameters that form an N-dimensional window feature vector is calculated, with the assumption that specific values of these components, relationships between components, or change in components in comparison with vectors in previous windows will provide event detection in the window under analysis in near real-time.

Event Detection

One or more of the following parameters may be used for event detection:

Characteristic envelope points calculated for high frequency (HF) mode of signal in the window (most likely to be specific for all detected events);

Energies of HF mode and low frequency (LF) residual of signal in the window;

RMS (vector). (RMS could be calculated over a smaller RMS-specific window);

Zero crossing may be added as well;

Characteristic "hit" (i.e. sound of a bat striking a ball) frequency at PSD (Power Spectral Density) calculated for signal in the window (if it exists);

Characteristic "hit" frequency extracted from instantaneous frequencies calculated for HF mode of the signal in the window (if it exists—events may exist without the presence of the characteristic hit frequency).

In one test, using the above methods, out of 105 events in video records of a given game, only 5 events could not be detected using the above parameters (in other words, the pattern parameters defined above didn't indicate an event). Thus an approximate 95% probability of event detection was found using commercially available and known recording methods. Effectiveness of sound capturing and processing can affect the probability of event detection, but as previously mentioned, an acceptable level of detection can vary from customer to customer.

For fifty of the 105 events in this example, all of the above parameters were useful; for 26 events, all parameters except RMS were useful. The remaining 24 events were detected only by the envelope pattern. For these events, the interference amplitudes generated by spectators were much stronger than the amplitudes generated by the events. The application of a directional microphone was found to significantly reduce the number of events detected only by envelope pattern (meaning that more events may be detected by the other methods), thus significantly improving the overall detection likelihood.

Detection Delay

One technique to deal with detection delay is as follows. Assuming a scenario where three sequential windows are accumulated for event detection (not necessarily a normal condition), the signal can be divided between two windows and a third window used for comparison. Detection delay time may be estimated at "window length×3+processing time." Given a typical length of the trigger event (bat hitting ball) of 50 ms, sometimes up to around 70-80 ms, and given an upper estimation of processing time (such as within a MATLAB environment) of around 50 ms, total time required for event detection would be around 290-300 ms, which should be sufficient time to energize LED lights to illuminate a fly ball for live play.

Noise Reduction

Testing has determined that a factor that might prevent characteristic frequency detection is the corruption of the HF mode by ambient noise. Frequency detection would be improved by application of a low pass filter (with cut-off significantly higher than the characteristic frequency) before decomposition of signal on HF and LF components. This filter ideally should preserve the specific features of HF mode, in particular, rise and fall times and maximum amplitude.

Event Patterns Selection

Amplitude pattern may be qualitatively described as follows.

For most events in this example, the length of corresponding audio signal interval is 20-50 ms (sometimes reaching 70-80 ms). If the hit is "strong", the amplitude envelope consists of two parts: a very fast increase and a slow (~exponential) decrease. The rise time is ~2-4 ms, while decrease takes ~20-30 ms. Amplitude maximum is 5-10 times greater than typical previous values. Typical frequency band is 1-5 KHz.

In many cases there is a dominant frequency of ~2 KHz. Sometimes this dominant frequency remains clearly visible even at small amplitudes. It resembles HF modulation with low typical audio frequency of ~70-110 Hz. Amplitudes related to spectators' reaction may achieve the values exceeding the events' maximum; however their rise time is significantly longer, also due to reaction time delay, reaction usually begins at the earliest in excess of ~500 ms after the event.

In case of a "low quality" event, the above pattern remains but its amplitudes are much smaller. It resembles "running" on LF interference audio (~100 Hz). In order to get quantitative description of the above pattern, the following tools were considered: spectrum, RMS calculation and Hilbert-Huang Transform (HHT). HTT is applied to short windows that are defined according to the specific problem. After HHT application, the signal is decomposed into high-frequency mode and low-frequency residue. If the window contains an event, then HF mode is similar to above described pattern.

Additionally, HHT provides modes envelopes, HF mode instantaneous frequencies and energies of HF mode and LF residue. All HHT-generated features (or parameters) may be applied to pattern detection. The most universal is HF mode envelope. It is practically the same for all detected events.

The envelope corresponding to event pattern may be described with a small set of morphological parameters, including energies of HF modes and LF residue (their absolute values and ratio) and RMS.

If the characteristic frequency is detected over a significant part of the event-related interval of the signal, the use of all frequency related parameters is more likely to detect a hit. Alternatively the characteristic frequency may be detected as a result of PSD calculation or as HHT instantaneous frequencies.

Due to short length of the event pattern and its similarity to a transition process, FFT (Fast Fourier Transform) or short FFT-based procedures are practically useless. HHT instantaneous frequencies are distorted by HF noise. To reduce the noise, a special low-pass filter can be used that preserves event pattern structure.

An additional tool was successfully tested: in some recordings, event amplitudes were corrupted by clipping, so a zero crossing procedure was applied for frequency evaluation. It provides band-pass of instantaneous frequencies (periods). Different parameters of their distribution might be used as components of a feature vector. For example, if STD of instantaneous frequencies is sufficiently small, then their mean value may be accepted as characteristic frequency. Otherwise band-pass bounds (e.g., 3-sigma pass) might be considered as frequency parameters. If nothing is accepted, a zero-crossing procedure also fails.

Event Statistics

As an example of the above methodology, Table 1 below provides statistical information relating to two exemplary games which were used in the above analysis. "Undetected" means an event was not indicated even though all of the pattern parameters defined above were applied. All events were selected in groups according to parameters (except frequencies) that indicate on event. Actual events were confirmed by review of video of the game or counting of events by a person in live attendance of the game.

TABLE 1

| Detection of Events and Methodology | | | |
|---|---|---|---|
| | 2 pm Game | 5 pm Game | Both games |
| Total events | 47 | 58 | 105 |
| All parameters indicate an event | 25 | 25 | 50 |
| All parameters except RMS indicate an event | 12 | 14 | 26 |
| Only envelope indicates an event | 8 | 16 | 24 |
| Undetected events | 2 | 3 | 5 |
| Characteristic frequency 2 KHz is found | 25 | 32 | 55 |

D. Exemplary Method and Apparatus Embodiment: Methodological Improvements/Modifications For some conditions and levels of play, additional methods or procedures may be considered most appropriate, with the following considerations:

Additional Considerations

1) Event Pattern

Analysis of professional level ("pro-level) baseball play, using more sophisticated audio equipment, including a directional microphone and post-recording processing tools, may provide additional information. Patterns and related tools defined for "school" level play are valid for professional level.

Pro-level recordings experienced almost no audio clipping; hence parameters related to amplitude pattern could be calculated. This allows all finite features of amplitudes envelope structure previously discussed to be considered for processing.

The method used is generally as follows: In order to get parameters related to amplitude dynamics in the event's vicinity (i.e., within the analysis window) Hilbert-Huang transform (HHT) is applied. One of the results of HHT is signal decomposition at high frequency mode and low frequency residue. Amplitude-related pattern parameters are extracted from high frequency mode, as previously discussed. The use of RMS as a distinguishing parameter is enhanced when higher grade audio equipment (or an audio signal without clipping) is used. Thus, the following pattern parameters were selected:

- Characteristic points of envelope, calculated for high frequency mode of signal in the window. Again, envelope-related parameters, which are specific for all detected events, were deemed the most essential.
- Energies of high frequency mode and low frequency residual of signal in the window.
- RMS—RMS should be calculated over 10 ms window.
- Characteristic "hit" frequency at PSD (Power Spectral Density) calculated for signal in the window (if it exists).
- Characteristic "hit" frequency extracted from instantaneous frequencies calculated for high frequency mode of the signal in the window (if it exists—i.e. if all tools applied for characteristic frequency evaluation fail, the event is considered to "not exist").
- The window for application of HHT was ~50 ms. In general, to create a multivariate detection algorithm, all parameters must be calculated at the same window. To override the difference between RMS and HHT windows, two options might be considered:
- Large window contains integer number of RMS window and all RMS values calculated inside this window (or their generalized parameters) are accepted as components of feature vector.
- RMS serves as a preliminary indicator for suspicious intervals—independent of all other components of feature vector.

2) Pattern Parameters Calculated in the Frequency Space.

At school games, characteristic frequency was selected to be ~2 KHz (and sometimes multiples of this value). At adult games frequencies detected were in the band [3-5] KHz.

Frequency parameters are very important for event detection but their evaluation is complicated: because an event related signal is too short and corrupted by noise. Because of short events length and fast amplitude changes, any tool based on Fourier transform (FFT, Short FFT or Welch algorithm) does not provide valid results.

Sometimes the evaluation of instantaneous frequency for HF mode as part of HHT is more effective. If noise or high frequency interference is too large this method also fails.

3) Estimation for Detection Delay

Detection delay is defined by same factors as for school games. Hence its upper boundary remains the same.

4) Influence of Bat Material Additional records analyzed did not provide additional data regarding influence of bat material on detection quality. Thus the main conclusion remained the same: aluminum bats, as found at school level games, have sound characteristics which are much more easily detected than wooden bats, and therefore are better subjects for bat-ball hit event detection.

Issues that can be Considered for Commercial Implementation

1) Design of Specific Band-Pass Filter for Noise & Interference Reduction

HF noise and LF interferences significantly complicate and may prevent evaluation of characteristic frequency parameters. To resolve this issue, a special band-pass filter for additional SNR improving can be implemented. Filtering can reduce low frequency interference (~200 Hz) and high frequency noise. HF noise "rides" on LF interference such that both amplitudes are of the same order.

Thus there are specific challenges in the filter design:

(a) A filter should preserve the specific features of high frequency mode; particularly rise and fall times and maximum amplitude.

(b) Analog or digital (or both) implementations should be considered. A bank of filters may be needed during algorithm development.

(c) The short length of new windows adds to difficulty for real-time digital implementation.

2) Robust Separation of Events and Glove-Ball Colliding

One of the features of the analyzed recordings was that audio generated by glove-ball colliding was not as strong as bat-ball colliding, and the frequency signature of aluminum or composite bats provided additional options for separation of two impacts. These two features were sufficient to distinguish between two types of impact.

Using the pro-level recordings, amplitude factor analysis failed since amplitudes of both impacts are similar. In fact, for school games, the glove-ball impact sometimes resulted in stronger amplitudes than the bat-ball collision event. The last 22 events in the video under consideration in this example (for which there were both audio and video records) were glove-ball hits and provided exemplary tests for analysis of the problem of discriminating between bat-ball events and glove-ball hits. Low amplitude audio generated by the ball striking the glove of a second player was also used for valid identification.

The conclusion was that the HF mode envelope features are a universal parameter that might be used to distinguish between bat-ball and glove-ball collisions. Frequency related pattern analysis is very useful feature but in many cases it can not be used. Development of effective band-pass filter as discussed previously can provide positive impact also on this problem.

In order to implement commercially, certain tests may be needed: First, two sets of data (training and checking) could be supplied, with each set including both professional and school level games. Second, high quality sound recordings could be synchronized with video records, and the type of bat being used could be identified.

E. Exemplary Method and Apparatus Embodiment: Analysis Techniques

Three 'bat-ball hit events' are discussed below as exemplary of the issues involved in triggering based on a hit event.

FIGS. 12A-2C represent audio signals over 4-sec intervals [tE−2, tE+2] and three separate denoted events. Note that events in FIGS. 12A and 12B are visually obvious, while the event of FIG. 12C is not.

Zoomed plots of the immediate time period of the events of FIGS. 12A-12C are presented in FIGS. 13A-13C.

The first two events (FIGS. 12A-12B) present a clear pattern. There is a rapid amplitude increase (about 0.5 ms, ~20 samples) with relatively slow monotonic decrease (~20 ms) There is a strong high frequency component that lasts for some time after the significant amplitude decrease has stopped (an additional ~20 ms).

The only similar feature of the signal for the third event (FIG. 12C) is a strong high frequency component.

Detection Tools

Spectrum, Hilbert-Huang transform (HHT) and RMS methods were used to extract these patterns and to check possible application of these patterns for a detection algorithm. Taking into account the short duration of event-related patterns, 4 second intervals were divided in windows (without overlapping) and tools were applied per window.

Taking into account the robustness criterion, the simplest and most obvious features were extracted as a result of tool application. Spectrum and HHT analysis methods were applied per 50 ms windows. RMS was calculated per 10 ms windows.

Spectrum

A frequency corresponding to the maximum amplitude was extracted from the spectrum, with the intent that at an event-related interval this frequency should be ~2 KHz according to the signal being considered and the results of audio buffer analysis. Maximum amplitude frequencies per buffer are presented in FIGS. 14A-14C. For events #1 and #2 maximum frequency exactly indicates event occurrence. However for FIGS. 14A-14B, the plots do not indicate strong HF component for the following buffer. This is explained by PSD plots for FIG. 15A. Here 3 spectra are represented: one for a buffer prior to the event, one for a buffer that contains event and one for a buffer after event. Prior to the event its characteristic frequency ~2 KHz is absent, and 90 Hz is dominant. At the event buffer the 2 KHz amplitude exceeds the amplitude at 90 Hz so that the peak at the corresponding buffer is generated at FIG. 14A. Immediately after the event, the amplitude of the characteristic 2 KHz frequency remains significant but it is lower than the amplitude of the 90 Hz low frequency. It persists until the low frequency component nearly disappears and high frequencies are once more detected in FIG. 14A.

Characteristics and detection for event #2 (FIG. 14B) are very similar to event #1.

For event #3 (FIG. 14C), time detection is correct but the indicated frequency is much lower ~700 Hz. PSD plots for this event are presented in FIG. 15B. They are similar to PSD plots for event #1 (FIG. 15A)—with the exception of the maximum amplitude frequency. It should be noted that in the video recording of the events, the sound from this event is clearly heard as much quieter that Events #1 and #2, probably as a result of the location on the bat where the ball strikes the bat in Event #3 is somewhat removed from the location on the bat of Events #1 and 2. Thus detection of event #3 must be considered as less clear.

HHT

HHT is relatively new but widely applied tool for decomposition of signal on intrinsic modes that are empirical—unlike Fourier or wavelet transforms where modes are pre-defined. After decomposition for each mode, instantaneous frequency may be calculated.

For the case under consideration, HTT results in separation of the high- and low frequency modes, and calculation of high-frequency envelope and modes energy E (sum of samples square). For calculations, z represents the signal in the window, h the high frequency mode and z–h the residue. Energies may be calculated for each item using the ratio E(h)/E(z).

Energies per buffer are presented in FIGS. 16A-16B. Ratios per buffer are presented in FIGS. 17A-17B.

For illustration, examples of decomposition are presented for event #1 in FIGS. 18A-18B and for event #3 in FIGS. 18C-18D. Two examples are given for each event: first prior to the event (FIGS. 18A and 18C), and then containing the event (FIGS. 18B and 18D). It may be seen that certain energy features—namely modes energy and ratio—provide good indicators for event detection, including event #3 which is in general more difficult to detect.

RMS per buffer is presented in FIGS. 19A-19C. This simplest indicator provides good detection for good case of events #1 and #2 but fails at event #3. Hence it might be used in combination with other features.

Conclusions

Preliminary analysis of school game audio with video reference leads to the following conclusion: simultaneous analysis of different indicators will be required in order to provide good results. HHT indicators are better than spectrum and RMS. For good detection the detection algorithm must be include two levels: (1) calculation of multi-component feature vector and (2) a decision block that takes into account indicator dynamics pre- and possibly post-event. The usability of post-event processing may depend on the associated triggering and lighting methods which will determine allowable processing time and overall detection delay.

F. Exemplary Method and Apparatus Embodiment: Video Sensor

Another embodiment uses one or more video cameras 700, FIGS. 7A and 7B, to determine if a ball is in a position that will require uplight illumination. For a baseball example, when the batter hits the ball, it will travel in an arc that will either stay below or enter the fly zone. A video camera would be aimed in a fixed position on a plane 705. When the ball crosses the plane at point 706, FIG. 7B, it is sensed at given scan line (e.g., represented at ref. no. 750 on a video display 749, FIG. 7D) or lines as indicated by a change in contrast or color for a horizontal and vertical location (i.e. one or more pixels) on the video display 749 within a given image area 760, FIG. 7D, the uplight illumination is actuated. In order to increase processing speed, to reduce cost, etc. the cameras could be limited to a very narrow vertical window 765, FIG. 7E of just one or a few lines. The remainder of the video signal 735 could either be discarded without processing, or a camera could be designed not to generate video signal except for narrow band 765. Video display could be done physically as shown in FIG. 7D, or virtually by calculation based on decoding a digital or analog video output signal, without necessarily displaying on a physical monitor. This sequence allows the uplight fixtures to be triggered before the ball reaches the limit of the ground zone lights at point 707 (FIG. 7B). FIG. 7D diagrammatically indicates flight of the ball, as well as crossing point 741 with plane 750 and crossing point 742 into window 760. FIG. 7E shows diagrammatically ball flight 766 through window 765.

The video sensor could be a single camera 700, FIG. 7 or multiple cameras 700, 710, and 720, FIG. 7C. If multiple cameras are used, their signals could be compared so that an object crossing a target pixel would be verified by another camera at a different angle. The view 710A from camera 710 would only include the object in the visual field 700A of the first camera 700 if it was within the playing area. For example, ball 730 is detected by camera 700 and confirmed by camera 710 to be in the center of its field and therefore confirmed to be a legitimate trigger event. Object 740 (e.g. traffic or spectators, etc.) is detected by camera 700 but not by camera 710.

More cameras could be used to provide a greater level of confirmation, without increasing the risk of unintended triggers, i.e. if one camera picked up a clear pixel change, or if two or more picked up possible pixel changes which were mathematically determined likely to be the same event, the lights would be actuated.

G. Exemplary Method and Apparatus Embodiment: Radar Sensor

One or more radar systems or transceivers 800, FIG. 8A could transmit a signal from a base that would sweep an angular area corresponding to a baseball field. The radar transceiver sends a signal 840 which bounces off any object in the path of the signal, creating a return signal 850 which is receive and interpreted by the transceiver. Objects would be identified as to angular position and distance with reference to the transceiver. When a ball approached the fly zone, the radar system would trigger the uplight illumination. Thus a ball at position 810 would trigger the uplight illumination before reaching position 820. Ball 830 could be determined not to be on a high trajectory and would not trigger uplight illumination, or given its velocity it might create an unintended trigger if the systems is tuned for maximum ability to detect all possible high flying balls. Note that while the signal 840 in FIG. 8A is shown as a narrow beam for the sake of clarity, the radar unit would actually scan the entire field and return information on the ball from any desired position.

Because radar can be used to sense both direction and speed, a system using radar to trigger uplight illumination could avoid unintended triggers caused by pitching (wrong direction) and return throws (slow speed). Data from the radar sensor could also be used to display statistical information such as pitched and hit ball speed, bat speed, etc. Multiple radar units 800, FIG. 8B, might be used to provide additional accuracy or enhanced statistical information.

A radar detection system could use technology such as the ZELOCITY® system from Zelocity Corporation (www.zelocity.com), or the TRACKMAN® system from Trackman™ (www.trackman.dk).

H. Exemplary Method and Apparatus Embodiment: Infrared (IR) Sensor

Infrared (IR) or infrared laser (IR laser) technology could be used to detect presence of a ball in an area. A laser emitter/detector 900 spreads a laser beam 905, FIG. 9A over an angular area 910, FIG. 9B. Any object within the plane would reflect IR back to the emitter/detector 900, which would trigger the uplight illumination. An example of this type of technology is available from Laser Technology, Inc. of Centennial, Colo. (http://www.lasertech.com).

I. Exemplary Method and Apparatus Embodiment: Manual Trigger

Another means of triggering uplighting is manual triggering. A human operator 1000 (FIG. 10) could monitor play and upon hearing and/or seeing a bat hit or seeing a fly ball would actuate a switch 1010 to activate the lights (via hardware and/or wireless communication). This could be done instead of, or in addition to, other methods of triggering and would provide another protection against failure to trigger for a ball in the fly zone. Manual triggering could activate the lights for a preset period, or for a time period chosen by the operator. This could be an economical option for, e.g., football where normally a football would be in the fly zone only after a kick or punt, which could be anticipated by a manual operator. Even without automatic triggering, this would have benefits by allowing very tight control of the area being illuminated by the standard field lighting, while making sufficient uplighting available for the less common instances when the ball is in play in the low light zone. A processor or electrical circuit could be configured to give priority to a manual trigger or an automatic trigger or could simply allow uplight 200 to be triggered by either, and uplight remain on for the longer of the automatic pre-set time or the worker 1000 manual actuation of trigger 1010.

J. Exemplary Method and Apparatus Embodiment: Equipment Trigger

Sports equipment could include sensors to signal the lighting system when a ball is in play and likely to be in the no light zone. A bat 1102 or ball 1101, FIG. 11A, could be fitted with a very small scale commercially available accelerometer or vibration sensor, 1100 FIG. 11A, pressure sensor 1110, IR LED 1120 etc., which could connect with the light activation system (FIG. 3) directly (e.g. by wireless network) or by means of a interface or scanning system such as e.g. a video camera 1115, FIG. 11B. This could also be done with a football, a punter or kicker's shoe, etc.

K. Exemplary Method and Apparatus Embodiment: Alternative Lighting Sources

An embodiment according to aspects of the current invention uses a non-LED light source to provide the uplight illumination. Light sources could include conventional incandescent lamps, halogen cycle lamps, or other lamps having the ability to be turned on rapidly enough to illuminate a ball in play by the time it reaches the darker fly zone. Such light sources might not provide the energy savings or other benefits of LED light sources but might provide economical alternatives for some applications.

Alternatively, HID lighting with a mechanism allowing rapid shuttering of the light, such as the SHOW LIGHT™ available from Musco Sports Lighting, LLC (also see U.S. Pat. No. 5,860,733, incorporated by reference herein) could be used in conjunction with the envisioned triggering methods in order to provide rapidly available intermittent uplighting without significantly contributing to unwanted uplight issues. Modifications could be made to the mechanism to allow for more rapid light response. These modifications could include allowing some of the light from the fixture to be directed to the field by special visor or reflector design when not needed in the fly zone rather than being completely blocked.

L. Options and Alternatives

The invention may take many forms and embodiments. The preceding examples are but a few of those.

What is claimed is:

1. A method of illuminating a rapidly moving sports object above a sports playing or observation area illuminated with sports lighting comprising:
   a. providing substantially controlled, concentrated, and aimed light downwardly from an elevated position towards the target area and a first space generally within a first distance above the target area;
   b. automatically sensing a triggering event or condition indicative of a player and sports object interaction which may result in unpredictable rapid movement of the sports object into a second space above the first space above the target area;
   c. within a short time interval from the automatic detection and for a time period thereafter, automatically concurrently providing temporary uplight aimed to the second space estimated to usefully illuminate the moving sports object while in the second space.

2. The method of claim 1 wherein the player and sport object interaction involves:
   a. a ball used in a sport;
   b. takes place within the short time interval;

c. is not readily predictable prior to its occurrence as to whether or not it will occur at any given time; and d. must be sensed while taking place.

3. The method of claim 1 wherein the automatic sensing comprises monitoring at or associated with the target area at least one of:

a. sound;
b. one or more images;
c. electromagnetic energy reflection;
d. movement; and
e. an equipment trigger.

4. The method of claim 3 wherein the monitoring comprises a calibrated threshold.

5. The method of claim 4 wherein the calibrated threshold for sound comprises an amplitude or frequency.

6. The method of claim 4 wherein the calibrated threshold for images comprises image recognition.

7. The method of claim 4 wherein the calibrated threshold for electromagnetic energy reflection comprises reflection of radio frequency energy from radar.

8. The method of claim 4 wherein the calibrated threshold for electromagnetic energy reflection comprises reflection of laser energy.

9. The method of claim 1 wherein the time period and quantity of temporary uplight comprises a fraction of the operation time and quantity of the aimed lighting relative to the target area.

10. The method of claim 9 wherein the fraction comprises between 5-10 seconds of time and on the order of 1:4 of quantity of light.

11. The method of claim 1 wherein the uplight comprises solid state lighting driven at or above rated operating power.

12. The method of claim 1 wherein the uplight comprises incandescent or halogen cycle lighting.

13. The method of claim 1 wherein short time interval for the automatic detection is a fraction of a second.

14. The method of claim 13 wherein the fraction of a second is on the order of 500 milliseconds or less.

15. The method of claim 1 wherein the controlled, concentrated aimed light deters glare, spill light, sky glow, and unwanted lighting conditions.

16. The method of claim 1 wherein the uplight promotes energy efficiency by having a limited time and quantity relative to the time and quantity of the controlled, concentrated aimed light to the target area.

17. An apparatus for providing uplight for use with a wide-area lighting system that provides down light down to a target area comprising:

a. one or more uplight lighting light sources adapted to be operatively positioned and aimed for uplight of an object in a space above the target area of the wide-area lighting system sufficient for illuminating the object rapidly moving in the space;

b. a circuit to turn on the uplight lighting sources; and c. an actuator to trigger the circuit at random or quasi-random selected times and under for short time intervals within a very short time interval after an actuation signal, the actuator including a sensor that senses movement indicative of the need uplight of the space above the target area.

18. The apparatus of claim 17 wherein the short time interval is on the order of 500 milliseconds or less.

19. The apparatus of claim 17 wherein the sensor automatically produces the actuation signal upon detection of a triggering event or condition which is unknown as to its exact time of occurrence.

20. The apparatus of claim 19 wherein the sensor comprises a. an acoustic sensor;
b. an image sensor;
c. a movement sensor;
d. an electromagnetic energy sensor; or
e. an equipment trigger.

21. The apparatus of claim 17 wherein the circuit comprises switches, relays, and/or contactors between an electrical power source and the light sources and the down light comprises sports lighting.

22. The apparatus of claim 17 wherein the actuator is calibrated to produce the actuation signal upon detection of a triggering event or condition indicative of the need for uplight.

23. The apparatus of claim 17 wherein the uplight lighting sources comprise a plurality of solid state light sources.

24. The apparatus of claim 23 wherein the actuator is adapted to overdrive the solid state light sources above their rated operating power for a limited period of time.

25. The apparatus of claim 24 further comprising a rechargeable battery for powering the uplight.

26. The apparatus of claim 17 wherein the actuator comprises a programmable processer.

27. A system for illuminating a target area and an object in a space above it comprising:

a. one or more wide-area lighting fixtures adapted to provide continuous substantially controlled, concentrated, and aimed light downwardly towards the target area from an elevated position for periods of time;

b. one or more uplight lighting sources adapted to be operatively positioned and aimed for uplight above the target area sufficient for illuminating the object rapidly moving in the space;

c. a circuit to turn on the uplight lighting sources; and d. an actuator to trigger the circuit at selected temporary times during the periods of time of downlighting, the actuator including a sensor that senses movement indicative of the need for uplight of the space above the target area.

28. The system of claim 27 wherein the actuator comprises a manually activated control.

29. The system of claim 27 wherein the sensor automatically produces a signal upon detection of a triggering event or condition.

30. The system of claim 29 wherein the sensor comprises:

a. an acoustic sensor;
b. an image sensor;
c. a movement sensor; and/or
d. an electromagnetic energy sensor; or
e. an equipment trigger.

31. The system of claim 27 wherein the circuit comprises switches, relays, and/or contactors and the down light comprises sports lighting.

32. The system of claim 27 wherein the actuator is calibrated to produce an actuation signal upon detection of a triggering event or condition indicative of the need for uplight.

33. The system of claim 27 wherein the uplight lighting fixture comprises a plurality of solid state light sources (e.g. LEDs).

34. The system of claim 33 wherein the actuator is adapted to overdrive the solid state light sources above their rated operating power for a limited period of time.

35. The system of claim 27 further comprising a controller operatively connected to the actuator and to an interface to the uplight lighting sources.

36. The system of claim 27 further comprising a plurality of wide-area lighting fixtures and one or more uplight lighting fixtures containing the uptight lighting sources.

37. The system of claim 36 further comprising one or more arrays of wide-area lighting fixtures and one or more uplight light fixtures or arrays of uplight light fixtures.

38. The system of claim 27 wherein the uplight light sources comprise an uplight fixture having continuous light output that can be quickly blocked or unblocked.

* * * * *

UNITED STATES PATENT AND TRADEMARK OFFICE
CERTIFICATE OF CORRECTION

| | | |
|---|---|---|
| PATENT NO. | : 8,952,628 B1 | Page 1 of 1 |
| APPLICATION NO. | : 12/939838 | |
| DATED | : February 10, 2015 | |
| INVENTOR(S) | : Myron Gordin et al. | |

It is certified that error appears in the above-identified patent and that said Letters Patent is hereby corrected as shown below:

In the Claims

<u>Col. 19, Claim 17, Line 59:</u>
ADD after need --for--

<u>Col. 21, Claim 36, Line 3:</u>
DELETE after the "uptight"
ADD after the --uplight--

Signed and Sealed this
Twenty-sixth Day of May, 2015

Michelle K. Lee
*Director of the United States Patent and Trademark Office*